(12) United States Patent
Omagari et al.

(10) Patent No.: US 10,081,913 B2
(45) Date of Patent: Sep. 25, 2018

(54) SHEET MANUFACTURING APPARATUS

(71) Applicant: SEIKO EPSON CORPORATION, Tokyo (JP)

(72) Inventors: Naoko Omagari, Nagano (JP); Naotaka Higuchi, Fujimi-machi (JP); Masahide Nakamura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/686,237

(22) Filed: Aug. 25, 2017

(65) Prior Publication Data

US 2017/0350073 A1    Dec. 7, 2017

Related U.S. Application Data

(63) Continuation of application No. 15/071,356, filed on Mar. 16, 2016, now Pat. No. 9,771,685.

(30) Foreign Application Priority Data

Mar. 18, 2015  (JP) .................................. 2015-054415
Feb. 18, 2016  (JP) .................................. 2016-028632

(51) Int. Cl.
| | | |
|---|---|---|
| D21F 9/00 | (2006.01) | |
| D21F 7/06 | (2006.01) | |
| D21B 1/08 | (2006.01) | |
| D04H 1/00 | (2006.01) | |
| D04H 1/732 | (2012.01) | |
| D21H 27/00 | (2006.01) | |
| D21B 1/06 | (2006.01) | |

(52) U.S. Cl.
CPC ................ D21F 9/00 (2013.01); D04H 1/00 (2013.01); D04H 1/732 (2013.01); D21B 1/068 (2013.01); D21B 1/08 (2013.01); D21F 7/06 (2013.01); *Y02W 30/642* (2015.05)

(58) Field of Classification Search
None
See application file for complete search history.

(56) References Cited

U.S. PATENT DOCUMENTS

| | | | |
|---|---|---|---|
| 8,882,965 B2 | 11/2014 | Yamagami et al. | |
| 9,174,243 B2 | 11/2015 | Nakamura | |
| 9,194,081 B2 | 11/2015 | Yamagami | |
| 2011/0250461 A1 | 10/2011 | Frost et al. | |

FOREIGN PATENT DOCUMENTS

| | | |
|---|---|---|
| JP | 2012-144819 A | 8/2012 |
| JP | 2015-066932 A | 4/2015 |
| JP | 2015-066933 A | 4/2015 |

*Primary Examiner* — Mary F Theisen

(57) ABSTRACT

A sheet manufacturing apparatus includes an impeller mill, a first sieve, a first belt, a rotary body, a second sieve, a second belt, and a heating roller. The impeller mill defibrates a raw material containing fiber and discharges a defibrated material. The first sieve screens the defibrated material by causing the defibrated material to pass through a first net. The defibrated material passing through the first sieve is deposited on the first belt to form a web. The rotary body has a protrusion radially protruded from a rotation center and divides the web by rotation to form a subdivided body. The second sieve refines the subdivided body by causing the subdivided body to pass through the second net to form a web. The refined subdivided body is deposited on the second belt to form a web. The heating roller heats the web from the second belt to form a sheet.

7 Claims, 13 Drawing Sheets

SHEET MANUFACTURING APPARATUS

CROSS-REFERENCE TO RELATED APPLICATIONS

This application is a continuation application of U.S. patent application Ser. No. 15/071,356 filed on Mar. 16, 2016. This application claims priority under 35 U.S.C. § 119 to Japanese Patent Application No. 2015-054415, filed on Mar. 18, 2015 and Japanese Patent Application No. 2016-028632, filed on Feb. 18, 2016. The entire disclosures of U.S. patent application Ser. No. 15/071,356, Japanese Patent Application No. 2015-054415, and Japanese Patent Application No. 2016-028632 are hereby incorporated herein by reference.

BACKGROUND

1. Technical Field

The present invention relates to a sheet manufacturing apparatus and a sheet manufacturing method.

2. Related Art

In the related art, as a sheet manufacturing apparatus, a so-called wet-type apparatus, in which a raw material containing fiber is poured in water, is disaggregated mainly by mechanical action, and is repulped, has been employed. In such a wet-type sheet manufacturing apparatus, a large amount of water is required and the apparatus is increased in size. Furthermore, time and effort are taken to provide maintenance of water treatment facilities and energy for a drying process is largely consumed.

Accordingly, in order to reduce the size and save energy, a dry-type sheet manufacturing apparatus in which as little water as possible is used has been proposed. A technique is described in JP-A-2012-144819 in which pieces of paper are defibrated into fibers by a dry-type defibrating machine, deinking of the fibers is performed in a cyclone, deinked fibers pass through a screen having small holes on a surface of a forming drum and are deposited on a mesh belt, and then paper is formed.

However, in a sheet manufacturing apparatus disclosed in JP-A-2012-144819, some of the fibers are adhered to the screen having the small holes on the surface of the forming drum and then cause clogging. The fibers cannot pass through the small hole in which clogging occurs and the fibers pass through the small hole in which clogging does not occur. Thus, a defibrated material may be unlikely to be uniformly dispersed on the mesh belt. When forming the paper in this state, paper having no uniform density and thickness is manufactured.

SUMMARY

An advantage of some aspects of the invention is to provide a sheet manufacturing apparatus that can manufacture a sheet having high uniformity in density and thickness. In addition, another advantage of some aspects of the invention is to provide a sheet manufacturing method that can manufacture the sheet having high uniformity in density and thickness.

The invention can be realized in the following aspects or application examples.

According to an aspect of the invention, there is provided a sheet manufacturing apparatus including a defibrating unit configured to defibrate a raw material containing fiber into a defibrated material; a screening unit configured to screen the defibrated material that is defibrated by the defibrating unit; a web forming unit configured to form a web on which the defibrated material screened by the screening unit is deposited; a dividing unit configured to divide the web formed by the web forming unit to form a subdivided body; a deposition unit configured to deposit the defibrated material configuring the subdivided body; and a forming unit configured to form the sheet by pressurizing and heating the defibrated material deposited by the deposition unit.

In this case, it is possible to suppress that a plurality of the defibrated materials are supplied to the deposition unit, for example, in a state where the plurality of the defibrated materials are aggregated into a lump shape by being entangled. Thus, it is possible to suppress that meshes of the deposition unit are clogged. Accordingly, in such a sheet manufacturing apparatus, it is possible to manufacture a sheet having high uniformity in density and thickness.

In the sheet manufacturing apparatus, the web forming unit may have a deposition surface on which the web is deposited; and a peeling unit configured to peel the web deposited on the deposition surface from the deposition surface.

In this case, it is possible to reliably peel the web from the deposition surface.

In the sheet manufacturing apparatus, the dividing unit may include a rotary body that includes a protrusion unit for forming the subdivided body by coming into contact with the web and then dividing itself.

In this case, since the subdivided body is reliably formed by the rotary body, it is possible to suppress that a plurality of the defibrated materials are supplied to the deposition unit, in a state where the plurality of the defibrated materials are entangled together and then become a large lump.

In the sheet manufacturing apparatus, the web forming unit may have a belt including the deposition surface and, at least two rollers by which the belt is stretched, the peeling unit may have a stationary plate, and the stationary plate may face a roller among the rollers, which is positioned on the rotary body side, and comes into contact with the belt.

In this case, it is possible to easily configure the peeling unit only by providing the stationary plate.

In the sheet manufacturing apparatus, the peeling unit may have an airflow generation unit configured to generate airflow in a direction in which the web is separated from the belt airflow in a direction in which the web is separated from the belt in the vicinity of the rotary body.

In this case, it is possible to reliably peel the web from the belt.

In the sheet manufacturing apparatus, the web forming unit may have a belt including the deposition surface. The sheet manufacturing apparatus may further include a control unit configured to control a rotational speed of the rotary body in compliance with a moving speed of the mesh belt.

In this case, it is possible to reduce the variation of the volume of the portion of subdivided bodies supplied to the deposition unit.

The sheet manufacturing apparatus may further include a detection unit configured to detect a thickness of the web. The control unit may control the moving speed of the belt based on the thickness of the web detected by the detection unit.

In this case, it is possible to reduce variation of an amount of the defibrated material per unit time supplied to the deposition unit.

The sheet manufacturing apparatus may further include a detection unit configured to detect a thickness of the web; and a control unit configured to control a rotational speed of the rotary body based on a thickness of the web detected by the detection unit.

In this case, it is possible to reduce the variation of the volume of the portion of subdivided bodies supplied to the deposition unit.

In the sheet manufacturing apparatus, the peeling unit may have an airflow generation unit, and peel the web from the deposition surface by an airflow generated by the airflow generation unit.

In this case, it is possible to peel the web without coming into contact with the deposition surface. Accordingly, it is possible to suppress a load to the deposition surface.

In the sheet manufacturing apparatus, the airflow generation unit may apply an airflow to the deposition surface at an acute angle.

In this case, it is possible to efficiently peel the web from the deposition surface.

In the sheet manufacturing apparatus, the web peeled from the deposition surface by the airflow generated by the airflow generation unit may be divided in a direction approximately parallel to the transporting direction of the web.

In this case, it is possible to reduce the volume of the subdivided body and to easily supply (transport) the subdivided body to the deposition unit.

In the sheet manufacturing apparatus, the moisture content of the airflow applied to the deposition surface may be adjusted.

In this case, an electrostatic charge of the web is suppressed, and it is possible to easily peel the web from the deposition surface.

In the sheet manufacturing apparatus, the dividing unit may include a suction unit for forming the subdivided body by suctioning the web and then dividing itself.

In this case, since the subdivided body is formed by suctioning the web peeled from the deposition surface, it is possible to suppress that a plurality of the defibrated materials are supplied to the deposition unit, in a state where the plurality of the defibrated materials are entangled together and then become a large lump.

In the sheet manufacturing apparatus, the web forming unit may include a belt including the deposition surface, a supporting unit which supports the belt, and a rotary roller which faces the supporting unit across the belt and the supporting unit, the web decomposed in the deposition surface may be nipped by the supporting unit and the rotary roller, the peeling unit may peel the web from the deposition surface by applying the airflow generated by the airflow generation unit to the deposition surface, on a downstream side of the web further in a transporting direction than the supporting unit, and the dividing unit may suction the web peeled by the peeling unit, by the suction unit.

In this case, it is possible to stabilize a position in which the web is peeled from the deposition surface (peeled amount) by applying the airflow to the deposition surface in a state where the web is nipped by the supporting unit and the rotary roller. It is possible to reduce variation of a volume of a subdivided body formed by suctioning the web peeled from the deposition surface.

In the sheet manufacturing apparatus, an air volume caused by the suction unit may be greater than an air volume caused by the airflow generation unit.

In this case, it is possible to suppress scattering or the like of the defibrated materials caused by the airflow of the airflow generation unit.

The sheet manufacturing apparatus may further include a supply unit configured to supply an additive agent to the subdivided body.

In this case, it is possible to mix the defibrated material and the additive agent with high uniformity.

In the sheet manufacturing apparatus, the web forming unit may have a mesh belt on which the web is deposited; and a suction unit configured to suction the defibrated material screened by the screening unit from a surface opposite to a surface of the mesh belt on which the web is deposited.

In this case, it is possible to remove foreign substances such as colorant contained in a screened material (first screened material) passing through the screening unit.

According to another aspect of the invention, there is provided a sheet manufacturing method including defibrating a raw material containing fiber into a defibrated material; screening the defibrated material that is defibrated; forming a web on which a screened defibrated material is deposited; forming a subdivided body by dividing the web; depositing the defibrated material configuring the subdivided body; and forming a sheet by pressurizing and heating a deposited defibrated material.

In such a sheet manufacturing method, it is possible to manufacture a sheet having high uniformity in density and thickness.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a preferred embodiment of the invention will be described in detail with reference to the drawings. Moreover, the embodiments described below do not unduly limit contents of the invention described in the claims. In addition, not all of the elements that are described are essential requirements of the invention.

1. First Embodiment 1.1. Sheet Manufacturing Apparatus
1.1.1. Configuration

Figure 1:
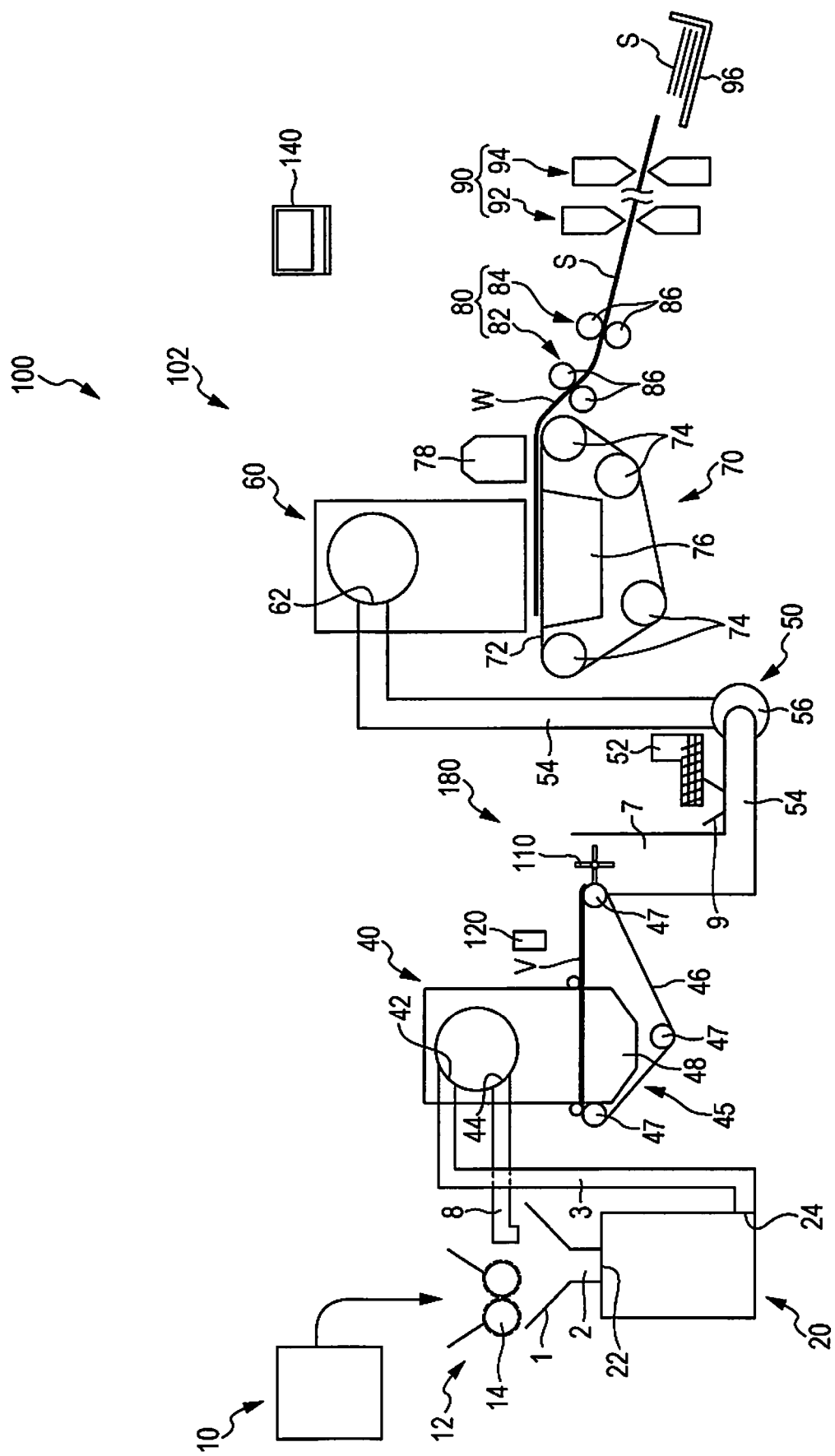
FIG. 1 is a view schematically illustrating a sheet manufacturing apparatus according to a first embodiment.

First, a sheet manufacturing apparatus according to a first embodiment will be described with reference to the drawings. FIG. 1 is a view schematically illustrating a sheet manufacturing apparatus 100 according to the first embodiment.

As illustrated in FIG. 1, the sheet manufacturing apparatus 100 includes a supply unit 10, a manufacturing unit 102, and a control unit 140. The manufacturing unit 102 manufactures a sheet. The manufacturing unit 102 has a crushing unit 12, a defibrating unit 20, a screening unit 40, a first web forming unit 45 (web forming unit), a mixing unit 50, a deposition unit 60, a second web forming unit 70, a sheet forming unit 80 (forming unit), and a cutting unit 90.

The supply unit 10 supplies a raw material to the crushing unit 12. The supply unit 10 is, for example, an automatic feeding unit for continuously feeding the raw material into the crushing unit 12. The raw material supplied by the supply unit 10 contains, for example, fiber such as waste paper and a pulp sheet.

The crushing unit 12 cuts the raw material supplied by the supply unit 10 into small pieces in the air. Shapes and sizes of the small pieces are, for example, several cm squares. In the illustrated example, the crushing unit 12 has crushing blades 14 and it is possible to cut the fed raw material by the crushing blades 14. As the crushing unit 12, for example, a shredder is used. The raw material that is cut by the crushing unit 12 is transported (transferred) to the defibrating unit 20 via a pipe 2 after being received from a hopper 1.

The defibrating unit 20 defibrates the raw material that is cut by the crushing unit 12. Here, "defibrating" refers to that the raw material (defibration object) formed by binding a plurality of fibers is untangled to the fibers one by one. The defibrating unit 20 also has a function of separating a material such as resin particles, ink, toner, and a blur-preventing agent adhering to the raw material from the fiber.

The "defibrated material" is referred to as one passing through the defibrating unit 20. The "defibrated material" may include resin (resin for bonding a plurality of fibers to each other) particles, colorant such as ink and toner, a blur-preventing agent, and additives such as paper strength enhancer which are separated from the fibers when the fibers are untangled in addition to the untangled defibrated material fiber. The shape of the defibrated material that is untangled is a string shape or a ribbon shape. The defibrated material that is untangled may be present in a state (independent stat) of not being entangled with other untangled fibers, or may be present in a state (state of forming a so-called "lump") of being lump-shaped by being entangled with other untangled defibrated material.

The defibrating unit 20 performs defibrating in the dry-type in the atmosphere (in the air). Specifically, as the defibrating unit 20, an impeller mill is used. The defibrating unit 20 has a function of suctioning the raw material and generating airflow to discharge the defibrated material. Thus, the defibrating unit 20 suctions the raw material from an inlet 22 by the airflow generated by the defibrating unit 20 together with the airflow, performs defibrating process, and can transport the defibrated material to an outlet 24. The defibrated material passing through the defibrating unit 20 is transferred to the screening unit 40 via a pipe 3.

The screening unit 40 feeds the defibrated material that is defibrated by the defibrating unit 20 from the inlet 42 and screens the defibrated material by a length of the fiber. As the screening unit 40, for example, a sieve (screen) is used. The screening unit 40 has a net (filter and screen) and can separate the fibers or particles (one passing through the net and a first screened material) that are smaller than meshes of the net in size and the fibers, non-defibrated pieces, or lump (one that does not pass through the net and a second screened material) that are larger than the meshes of the net in size. For example, the first screened material is fed to the mixing unit 50 via a pipe 7. The second screened material is returned from the outlet 44 to the defibrating unit 20 via a pipe 8. Specifically, the screening unit 40 is a cylindrical sieve that can be rotated by a motor. As the net of the screening unit 40, for example, a metal net, expanded metal that is formed by extending a metal plate in which cut lines are run, and a perforated metal in which holes are formed in a metal plate by a press machine are used.

The first web forming unit 45 transports the first screened material passing through the screening unit 40 to the mixing unit 50. The first web forming unit 45 includes a mesh belt 46 which is used as a belt including a deposition surface, tension rollers 47, and a suction unit (suction mechanism) 48.

The suction unit 48 is able to suction the first screened material passing through openings (openings of the net) of the screening unit 40 and being dispersed in the air on the mesh belt 46. The first screened material is deposited on the moving mesh belt 46 and forms a web V. Basic configurations of the mesh belt 46, the tension rollers 47, and the suction unit 48 are similar to a mesh belt 72, tension rollers 74, and a suction mechanism 76 of the second web forming unit 70 described below.

The web V is formed in a soft and inflated state rich in air by going through the screening unit 40 and the first web forming unit 45. The web V that is deposited on the mesh belt 46 is fed into the pipe 7 and is transported to the mixing unit 50.

The mixing unit 50 mixes the first screened material (first screened material transported by the first web forming unit 45) passing through the screening unit 40 and the additive agent containing the fiber. The mixing unit 50 has an additive agent supply unit 52 (supply unit) which supplies an additive agent, a pipe 54 transporting the first screened material and the additive agent, and a blower 56. In an illustrated example, the additive agent is supplied from the additive agent supply unit 52 to the pipe 54 via a hopper 9. The pipe 54 is continuous with the pipe 7.

In the mixing unit 50, airflow is generated by the blower 56 and in the pipe 54, the first screened material and the additive agent can be transported while being mixed. Moreover, a mechanism for mixing the first screened material and the additive agent is not specifically limited and may be one that stirs the first screened material and the additive agent by blades at a high speed or may use rotation of a container such as a V-type mixer.

As the additive agent supply unit 52, a screw feeder illustrated in FIG. 1, a disk feeder (not illustrated), or the like is used. The additive agent supplied from the additive agent supply unit 52 contains resin for bonding a plurality of the fibers. The plurality of the fibers are not bonded at the time of supplying the resin. The resin is melted when passing through the sheet forming unit 80 and the plurality of the fibers are bonded.

The resin supplied from the additive agent supply unit 52 is thermoplastic resin or thermosetting resin, and includes, for example, AS resin, ABS resin, polypropylene, polyethylene, polyvinyl chloride, polystyrene, acrylic resin, polyester resin, polyethylene terephthalate, polyphenylene ether, polybutylene terephthalate, nylon, polyamide, polycarbonate, polyacetal, polyphenylene sulfide, polyether ether ketone, and the like. Those resins may be used singly or may be used by being appropriately mixed. The additive agent supplied from the additive agent supply unit 52 may be fibrous or may be powder.

Colorant for coloring the fibers, aggregation preventing material inhibitor for preventing aggregation of the fibers, and flame retardant for the fibers and the like making it difficult to burn may be contained in the additive agent supplied from the additive agent supply unit 52 depending on the type of the manufactured sheet in addition to the resin for bonding the fibers. The mixture (mixture of the first screened material and the additive agent) passing through the mixing unit 50 is transferred to the deposition unit 60 via the pipe 54.

The deposition unit 60 introduces the mixture passing through the mixing unit 50 from an inlet 62, refines the entangled defibrated material (fibers), and causes the defibrated material to fall while dispersing the defibrated material. Furthermore, if the resin of the additive agent supplied from the additive agent supply unit 52 is fibrous, the deposition unit 60 refines the entangled resin. Thus, the deposition unit 60 can uniformly deposit the mixture on the second web forming unit 70.

As the deposition unit 60, a rotating cylindrical sieve is used. The deposition unit 60 has a net and causes the resin or particles (passing through the net) smaller than meshes of the net in size contained in the mixture passing through the mixing unit 50 to fall. A configuration of the deposition unit 60 is, for example, the same as the configuration of the screening unit 40.

Moreover, the "sieve" of the deposition unit 60 may not have a function for screening a specific object. That is, the "sieve" used as the deposition unit 60 means to have the net and the deposition unit 60 possibly cause all the mixtures introduced into the deposition unit 60 to fall.

The second web forming unit 70 forms a web W by depositing a passing-through material passing through the deposition unit 60. The second web forming unit 70 has, for example, the mesh belt 72, the tension rollers 74, and the suction mechanism 76.

The mesh belt 72 deposits the passing-through material passing through the openings (openings of the net) of the deposition unit 60 while moving. The mesh belt 72 is stretched by the tension rollers 74 and is configured such that air is unlikely to pass through the passing-through material. The mesh belt 72 is moved by rotation of the tension rollers 74. The passing-through material passing through the deposition unit 60 continuously falls and deposits while the mesh belt 72 is continuously moved. Thus, the web W is formed on the mesh belt 72. The mesh belt 72 is, for example, made of metal, resin, fabric, non-woven fabric, and the like.

The suction mechanism 76 is provided below (side opposite to the deposition unit 60 side) the mesh belt 72. The suction mechanism 76 can generate airflow (airflow from the deposition unit 60 to the mesh belt 72) downward. It is possible to suction the mixture, which is dispersed in the air by the deposition unit 60, on the mesh belt 72 by the suction mechanism 76. Thus, it is possible to increase a discharge speed from the deposition unit 60. Furthermore, it is possible to form a down-bow in a fall path of the mixture and to prevent the defibrated material and the additive agent to be entangled during falling by the suction mechanism 76.

As described above, the web W is formed in a soft and inflated state rich in air by going through the deposition unit 60 and the second web forming unit 70 (web forming process). The web W deposited in the mesh belt 72 is transported to the sheet forming unit 80.

Moreover, in the illustrated example, a moisture-adjusting unit 78 that adjusts moisture of the web w is provided. The moisture-adjusting unit 78 can adjust an amount ratio of the web W and water by adding water or steam to the web W.

The sheet forming unit 80 forms a sheet S by pressurizing and heating the web W deposited on the mesh belt 72. In the sheet forming unit 80, it is possible to bond the plurality of the fibers together in the mixture via the additive agent (resin) by heating the defibrated material and the mixture of the additive agent mixed in the web W.

As the sheet forming unit 80, for example, a heating roller (heater roller), a heat press molding machine, a hot plate, a hot air blower, an infrared heater, and a flash fixing machine are used. In the illustrated example, the sheet forming unit 80 includes a first bonding unit 82 and a second bonding unit 84, and the bonding units 82 and 84 respectively include a pair of heating rollers 86. By configuring the bonding units 82 and 84 as the heating rollers 86, it is possible to form the sheet S while continuously transporting the web W by configuring the bonding units 82 and 84 as the heating rollers 86 compared to a case where the bonding units 82 and 84 are configured as a flat press device (plate press device). Moreover, the number of the heating rollers 86 is not specifically limited.

The cutting unit 90 cuts the sheet S formed by the sheet forming unit 80. In the illustrated example, the cutting unit 90 has a first cutting unit 92 that cuts the sheet S in a direction intersecting a transporting direction of the sheet S and a second cutting unit 94 that cuts the sheet S in a direction parallel to the transporting direction. The second cutting unit 94 cuts, for example, the sheet S passing through the first cutting unit 92.

As described above, the cutform-shaped sheet S having a predetermined size is formed. The cutform-shaped sheet S that is cut is discharged to a discharge unit 96.

1.1.2. Rotary Body (Dividing Unit) and Detection Unit

Figure 2:
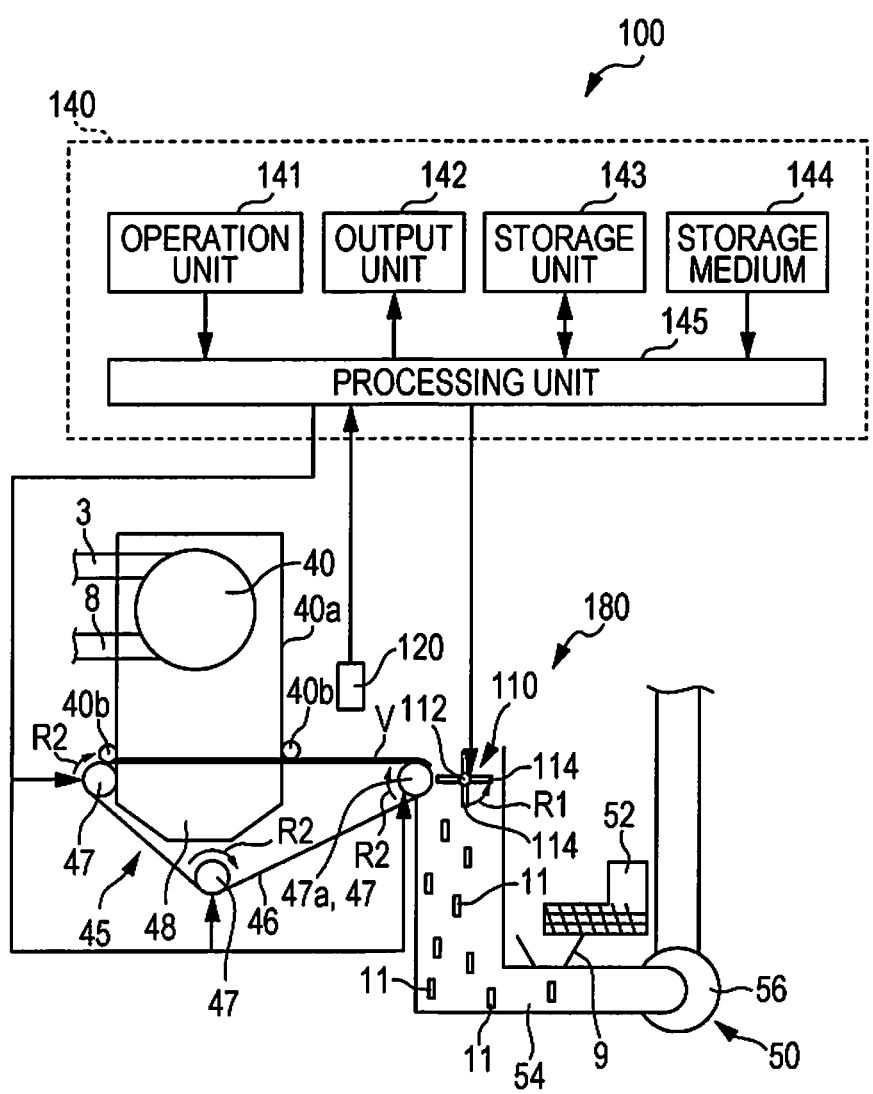
FIG. 2 is a view schematically illustrating the sheet manufacturing apparatus according to the first embodiment.

The sheet manufacturing apparatus 100 further includes a dividing unit 180. The dividing unit 180 divides the web V formed by the first web forming unit 45 to form the subdivided bodies 11. The dividing unit 180 according to the present embodiment has a rotary body 110. Here, FIG. 2 is an enlarged view of a region including the rotary body 110 of FIG. 1 schematically illustrating the sheet manufacturing apparatus 100. Furthermore, a functional block view of the control unit 140 of the sheet manufacturing apparatus 100 is illustrated in FIG. 2.

The suction unit 48 of the first web forming unit 45 suctions the defibrated material screened by the screening unit 40 from a surface opposite to the surface of the mesh belt 46 on which the web V is deposited and the first web forming unit 45 forms the web V on which the defibrated material screened by the screening unit 40 is deposited. Then, as illustrated in FIG. 2, the rotary body 110 forms subdivided bodies 11 by dividing (cutting or shearing) the web V formed by the first web forming unit 45.

The rotary body 110 has a base unit 112 and a protrusion unit 114 protruding from the base unit 112. The protrusion unit 114 has, for example, a planar shape. In the illustrated example, four protrusion units 114 are provided and the four protrusion units 114 are provided at equal intervals. Moreover, although not illustrated, the number of the protrusion units 114 is not specifically limited and may be, for example, two. In addition, a shape of the protrusion unit 114 is not specifically limited.

The rotary body 110 can rotate in an arrow direction R1. Specifically, the base unit 112 rotates in the arrow direction R1 and thereby the protrusion units 114 can rotate around the base unit 112. The tension rollers 47 of the first web forming unit 45 can rotate in an arrow direction R2. A rotating direction of the rotary body 110 and a rotating direction of the tension roller 47 are opposite to each other. A rotational speed of the rotary body 110 is greater than a rotational speed of the tension roller 47. The peripheral speed of the rotary body 110 (speed of the tip end of the protrusion unit 114) is greater than the moving speed of the mesh belt 46 (transporting speed of the web V). For example, in a case where the moving speed of the mesh belt 46 is set in a range of 20 mm to 100 mm per second, the peripheral speed of the rotary body 110 is set to a speed which is five or more times the moving speed of the mesh belt 46.

The rotary body 110 is provided in the vicinity of the first web forming unit 45. In the illustrated example, the rotary body 110 is provided in the vicinity of a tension roller 47a positioned on a downstream side in a path of the web V. More specifically, the rotary body 110 is provided next (position separated from the tension roller 47a on a downstream side (mixing unit 50 side) in a horizontal direction) to the tension roller 47a. The rotary body 110 is provided in a position in which the protrusion units 114 can come into contact with the web V and does not come into contact with the mesh belt 46 on which the web V is deposited. Thus, it is possible to suppress that the mesh belt 46 is worn (damaged) by the protrusion units 114. The shortest distance between the protrusion unit 114 and the mesh belt 46 is, for example, equal to or greater than 0.05 mm and equal to or less than 0.5 mm, and is preferably 0.1 mm.

A thickness (length in the rotating direction) of the protrusion unit 114 is, for example, equal to or greater than 0.1 mm and equal to or less than 3 mm and is preferably 0.8 mm. In addition, a width (length in a direction of a rotational axis) of the protrusion unit 114 is appropriately determined in compliance with the width (length in a direction orthogonal to the transporting direction of the web V) of the web V. In addition, the length (length in a direction orthogonal to the rotational axis) of the protrusion unit 114 is appropriately determined in compliance with a positional relationship between the rotary body 110 and the web V (mesh belt 46 or the tension roller 47a).

The web V is divided and becomes the subdivided body 11 by the protrusion units 114 of the rotary body 110 and is introduced into the mixing unit 50 via the pipe 7 by, for example, its own weight or airflow generated in the mixing unit 50. The additive agent supply unit 52 of the mixing unit 50 supplies the additive agent to the subdivided body 11. A size or a shape of the subdivided body 11 is not specifically limited and a volume of the subdivided body 11 is, for example, equal to or greater than 5 mm$^3$ and equal to or less than 25000 mm$^3$.

The deposition unit 60 deposits the defibrated material configuring the subdivided body 11. Specifically, the deposition unit 60 refines the subdivided body 11 and deposits the refined subdivided body 11 (defibrated material configuring the subdivided body 11) on the mesh belt 72. Then, the sheet forming unit 80 forms the sheet S by pressurizing and heating the defibrated material that is deposited by the deposition unit 60.

The sheet manufacturing apparatus 100 further has a detection unit 120. The detection unit 120 detects a thickness of the web V deposited on the mesh belt 46. The detection unit 120 is, for example, an optical sensor that receives reflected light in a front surface and reflected light in a rear surface of the web V and detects the thickness of the web V based on a time difference between the reflected light in the front surface and the reflected light in the rear surface. The detection unit 120 faces, for example, the mesh belt 46. Moreover, a shape of the detection unit 120 is not specifically limited as long as the thickness of the web V can be detected.

Moreover, in the illustrated example, the sheet manufacturing apparatus 100 has a housing unit 40a accommodating the screening unit 40 and a pile seal 40b provided in the housing unit 40a. The pile seal 40b is configured of, for example, a brush in which fine hairs are densely implanted on a surface of a base unit and the brush comes into contact with the mesh belt 46. The pile seal 40b can suppress that the defibrated material screened by the screening unit 40 is leaked from a gap between the housing unit 40a and the mesh belt 46.

1.1.3. Control Unit

As illustrated in FIG. 2, the control unit 140 of the sheet manufacturing apparatus 100 has an operation unit 141, an output unit 142, a storage unit 143, a storage medium 144, and a processing unit 145.

The operation unit 141 acquires an operation signal in compliance with an operation of a user and performs a transferring process of the signal to the processing unit 145. The operation unit 141 is, for example, buttons, keys, a touch panel type display, a mouse, and the like.

The output unit 142 displays a processing result of the processing unit 145 based on the signal input from the processing unit 145. The output unit 142 displays, for example, the processing result of the processing unit 145 with letters. The output unit 142 is, for example, a liquid crystal display (LCD), a cathode ray tube (CRT), a touch panel type display, and the like. Moreover, the output unit 142 may output the processing result of the processing unit 145 by sound.

The storage unit 143 stores programs and data for performing various control processes by the processing unit 145. The storage unit 143 is further used as an operation region of the processing unit 145 and temporarily stores operation signals input from the operation unit 141, programs and data read from the storage medium 144 and the like, a calculation result executed by the processing unit 145 in accordance with various programs, and the like.

The storage medium 144 is a computer-readable storage medium for storing various application programs and data. Moreover, the programs may be distributed in the storage medium 144 (storage unit 143) from an information storage medium included in a host device (server) via a network. The storage medium 144 may also function as a storage unit that stores data that is necessary for being stored for a long period of time among data generated by the process of the processing unit 145. The storage medium 144 is realized by, for example, an optical disk (CD and DVD), magneto-optical disk (MO), a magnetic disk, a hard disk, a magnetic tape, and a memory (ROM, a flash memory, and the like).

The processing unit 145 performs various processes in compliance with programs stored in the storage unit 143 or programs stored in the storage medium 144. Specifically, the processing unit 145 performs the following process. The function of the processing unit 145 can be realized by various processors (CPU, DSP, and the like), hardware such as a gate array (ASIC), and programs. Moreover, at least a part of the processing unit 145 may be realized by hardware (dedicated circuit).

Figure 3:
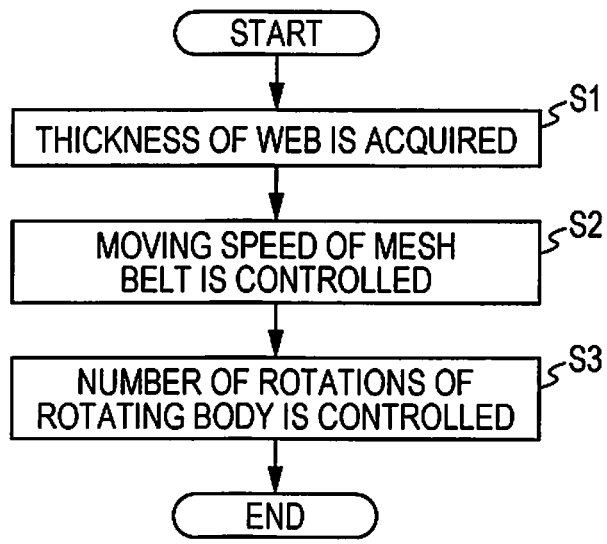
FIG. 3 is a flowchart describing a process of a control unit of the sheet manufacturing apparatus according to the first embodiment.

Here, FIG. 3 is a flowchart describing the process of the control unit 140.

For example, when the user requests a process via the operation unit 141, the processing unit 145 receives an operation signal from the operation unit 141 and starts the process.

First, the processing unit 145 receives a signal from the detection unit 120 and acquires the thickness of the web V detected by the detection unit 120 (S1). The processing unit 145 may perform a process of displaying the acquired thickness of the web V on the output unit 142.

Next, the processing unit 145 controls the moving speed of the mesh belt 46 based on the thickness of the web V detected by the detection unit 120 (S2). Specifically, the processing unit 145 receives a signal from the detection unit 120, outputs the signal to a first driving unit (driving unit for driving the tension roller 47) (not illustrated), and controls the rotational speed of the tension roller 47.

If the thickness of the web V detected by the detection unit 120 is, for example, greater than a predetermined value, the processing unit 145 is controlled such that the moving speed of the mesh belt 46 is decreased. Thus, it is possible to suppress that an amount of the defibrated material per unit time supplied to the mixing unit 50 is increased. In addition, for example, if the thickness of the web V detected by the detection unit 120 is, for example, less than a predetermined value, the processing unit 145 is controlled such that the moving speed of the mesh belt 46 is increased. Thus, it is possible to suppress that the amount of the defibrated material per unit time supplied to the mixing unit 50 is decreased. That is, the processing unit 145 controls the moving speed of the mesh belt 46 such that variation of the amount (mass) of the defibrated material per unit time supplied to the mixing unit 50 is reduced.

Next, the processing unit 145 controls the rotational speed (number of rotations) of the rotary body 110 in compliance with the moving speed of the mesh belt 46 (based on the moving speed) (S3). Specifically, the processing unit 145 outputs a signal to a second driving unit (driving unit for driving the rotary body 110) (not illustrated) after outputting a signal to the first driving unit and controls the number of rotations of the rotary body 110. For example, the moving speed of the mesh belt 46 and data regarding the number of rotations of the rotary body 110 are stored in the storage unit 143 in advance and the processing unit 145 may output a signal to the second driving unit by acquiring information regarding the number of rotations of the rotary body 110 based on the data.

For example, in step S2, if control of the mesh belt 46 is performed such that the moving speed of the mesh belt 46 is decreased, the processing unit 145 is controlled such that the number of rotations of the rotary body 110 is decreased. Thus, it is possible to suppress that a volume of the subdivided body supplied 11 to the mixing unit 50 is reduced. In addition, for example, in step S2, if the control is performed such that the moving speed of the mesh belt 46 is increased, the processing unit 145 is controlled such that the number of rotations of the rotary body 110 is increased. Thus, it is possible to suppress that the volume of the subdivided body 11 supplied to the mixing unit 50 is increased. That is, the processing unit 145 controls the number of rotations of the rotary body 110 such that variation of the volume of the subdivided body 11 supplied to the mixing unit 50 is reduced.

Moreover, the sheet manufacturing apparatus 100 has a detection unit (not illustrated) detecting the moving speed of the mesh belt 46 and the processing unit 145 may control the number of rotations of the rotary body 110 based on the moving speed of the mesh belt 46 detected by the detection unit.

The processing unit 145 controls, for example, the number of rotations of the rotary body 110 (signal is output to the second driving unit) and then completes the process.

Figure 4:
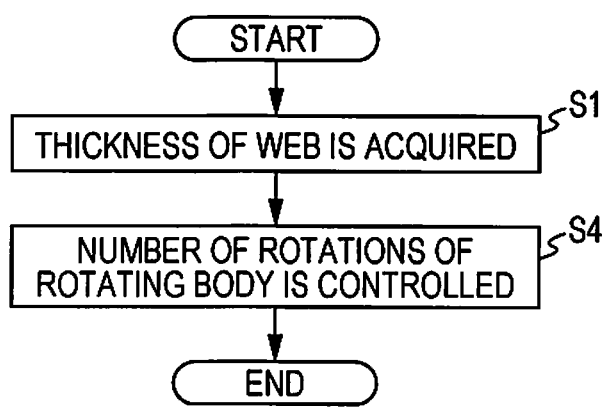
FIG. 4 is a flowchart describing the process of the control unit of the sheet manufacturing apparatus according to the first embodiment.

Moreover, as illustrated in FIG. 4, the processing unit 145 may control the number of rotations of the rotary body 110 based on the thickness of the web V detected by the detection unit 120 after step S1 (S4). Specifically, the processing unit 145 outputs a signal to the second driving unit (not illustrated) by receiving the signal from the detection unit 120 and may control the number of rotations of the rotary body 110.

For example, if the thickness of the web V detected by the detection unit 120 is greater than a predetermined value, the processing unit 145 may be controlled such that the number of rotations of the rotary body 110 is increased. Thus, it is possible to suppress that the volume of the subdivided body 11 supplied to the mixing unit 50 is increased. In addition, for example, if the thickness of the web V detected by the detection unit 120 is less than the predetermined value, the processing unit 145 may be controlled such that the number of rotations of the rotary body 110 is decreased. Thus, it is possible to suppress that the volume of the subdivided body 11 supplied to the mixing unit 50 is decreased.

The sheet manufacturing apparatus 100 has, for example, the following characteristics.

The sheet manufacturing apparatus 100 has the first web forming unit 45 that forms the web V on which the defibrated material screened by the screening unit 40 is formed and the rotary body 110 that includes the protrusion units 114 for forming the subdivided body 11 by dividing the web V formed by the first web forming unit 45. Thus, in the sheet manufacturing apparatus 100, for example, it is possible to reduce the variation of the amount of the defibrated material per unit time supplied to the deposition unit 60. Furthermore, for example, it is possible to reduce the variation of the volume of the subdivided body 11 supplied to the deposition unit 60. Thus, in the sheet manufacturing apparatus 100, it is possible to suppress that the plurality of the defibrated materials are supplied to the deposition unit 60 in a state where the plurality of the defibrated materials are entangled together and then become a large lump and to suppress that meshes of the deposition unit 60 are clogged. Thus, in the sheet manufacturing apparatus 100, it is possible to manufacture the sheet S having high uniformity in density and thickness.

Furthermore, since the sheet manufacturing apparatus 100 includes the first web forming unit 45, it is possible to further reduce the variation of the amount of the defibrated material per unit time supplied to the deposition unit 60. For example, the defibrated material is adhered on an inner wall of the pipe 3 connecting the defibrating unit 20 and the screening unit 40 and then even if the amount of the defibrated material per unit time supplied to the screening unit 40 is varied, it is possible to transport the defibrated material to the deposition unit 60 in a state where variation of the amount of the defibrated material is reduced by depositing the defibrated material on the mesh belt 46 of the first web forming unit 45.

In the sheet manufacturing apparatus 100, the control unit 140 controls the rotational speed of the rotary body 110 in compliance with the moving speed of the mesh belt 46. Thus, in the sheet manufacturing apparatus 100, it is possible to reduce the variation of the volume of the subdivided body 11 supplied to the deposition unit 60.

In the sheet manufacturing apparatus 100, the control unit 140 controls the moving speed of the mesh belt 46 based on the thickness of the web V detected by the detection unit 120. Thus, in the sheet manufacturing apparatus 100, it is possible to reduce the variation of the amount of the defibrated material per unit time supplied to the deposition unit 60.

In the sheet manufacturing apparatus 100, the control unit 140 may control the rotational speed of the rotary body 110 based on the thickness of the web V detected by the detection unit 120. Thus, in the sheet manufacturing apparatus 100, it is possible to reduce the variation of the volume of the subdivided body 11 supplied to the deposition unit 60.

The sheet manufacturing apparatus 100 has the additive agent supply unit 52 that supplies the additive agent to the subdivided body 11. Thus, in the sheet manufacturing apparatus 100, it is possible to uniformly mix the defibrated material and the additive agent. For example, even if the additive agent is supplied to the web V in a state where the web V is not divided, the defibrated material and the additive agent may not be uniformly mixed. Furthermore, in the sheet manufacturing apparatus 100, since it is possible to reduce the variation of the amount of the defibrated material per unit time supplied to the mixing unit 50, for example, it is possible to reduce a time when the defibrated material is not present in the mixing unit 50. Thus, for example, if the additive agent is continuously supplied from the additive agent supply unit 52, it is possible to decrease the amount of the additive agent that is not mixed into the defibrated material and to suppress that the additive agent is wasted. Thus, for example, it is possible to reduce the cost.

The sheet manufacturing apparatus 100 has the suction unit 48 that suctions the defibrated material screened by the screening unit 40. Thus, in the sheet manufacturing apparatus 100, it is possible to remove the foreign matter such as colorant contained in the first screened material passing through the screening unit 40.

In the sheet manufacturing apparatus 100, the protrusion unit 114 has a planar shape. Thus, even if the protrusion unit 114 comes into contact with the mesh belt 46, it is possible to reduce a possibility of damaging the mesh belt 46. For example, if a shape of a tip of the protrusion unit is a sharp blade-shaped, it is possible to increase the possibility of damaging the mesh belt when the protrusion unit comes into contact with the mesh belt.

In a sheet manufacturing method according to the embodiment, for example, the sheet manufacturing apparatus 100 is used. The sheet manufacturing method using the sheet manufacturing apparatus 100, as described above includes a step of defibrating the raw material containing the fibers into the defibrated material, a step of screening the defibrated material that is defibrated, a step of forming the web V on which the screened defibrated material is deposited, a step of forming the subdivided body 11 by dividing the web V, a step of depositing the defibrated material configuring the subdivided body 11, and a step of forming the sheet by pressurizing and heating the defibrated material that is deposited. Thus, in the sheet manufacturing method using the sheet manufacturing apparatus 100, it is possible to manufacture the sheet S having high uniformity in density and thickness.

1.2. Modification Example of Sheet Manufacturing Apparatus

Figure 5:
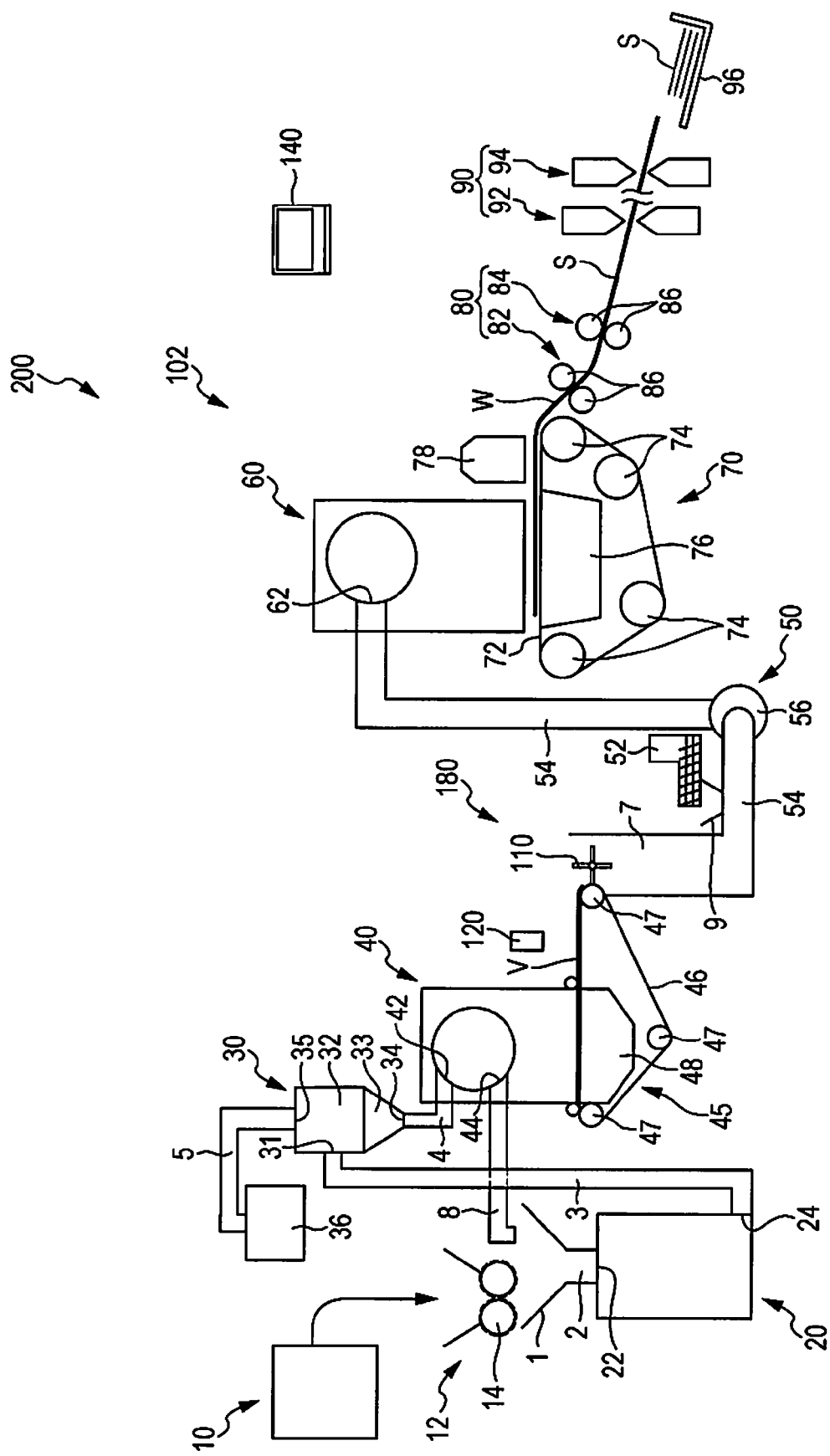
FIG. 5 is a view schematically illustrating a sheet manufacturing apparatus according to a modification example of the first embodiment.

Next, a sheet manufacturing apparatus of a modification example of the first embodiment will be described with reference to the drawings. FIG. 5 is a view schematically illustrating a sheet manufacturing apparatus 200 according to the modification example of the first embodiment. Hereinafter, in the sheet manufacturing apparatus 200, points different from the example of the above-described sheet manufacturing apparatus 100 will be described and description of the same points will be omitted.

As illustrated in FIG. 5, the sheet manufacturing apparatus 200 is different from the sheet manufacturing apparatus 100 described above in that a classifying unit 30 is provided. In the sheet manufacturing apparatus 200, the defibrated material passing through a defibrating unit 20 is fed to the classifying unit 30 via a pipe 3.

The classifying unit 30 classifies the defibrated material passing through the defibrating unit 20. Specifically, the classifying unit 30 classifies and removes a defibrated material (resin particles, colorant, additive agent, and the like) having a relatively small size and low density among the defibrated materials. Thus, it is possible to increase a proportion of the fibers having a relatively large size and high density among the defibrated materials.

As the classifying unit 30, an airflow type classifier is used. The airflow type classifier generates a whirling air current, separates the defibrated materials by a difference in centrifugal force received by the size and density of the defibrated materials that are classified, and can adjust classification points by adjusting a speed of airflow and the centrifugal force. Specifically, as the classifying unit 30, cyclone, elbow jet, eddy classifier, and the like are used. Particularly, since the cyclone is simple in structure as illustrated in the view, it is possible to appropriately use the cyclone as the classifying unit 30.

The classifying unit 30 has, for example, an inlet 31, a cylindrical unit 32 that is connected to the inlet 31, an inverse cone unit 33 that is positioned below the cylindrical unit 32 and is connected to the cylindrical unit 32, a lower outlet 34 that is provided in a lower center of the inverse cone unit 33, and an upper outlet 35 that is provided in an upper center of the cylindrical unit 32.

In the classifying unit 30, the airflow carrying the defibrated material introduced from the inlet 31 is changed into a circumferential movement by the cylindrical unit 32. Thus, the centrifugal force is applied to the introduced defibrated material and the classifying unit 30 separates the defibrated material into fiber (first classified material) of which the size and density are higher than resin particles or ink particles among the defibrated materials and the resin particles, colorant, the additive agent, and the like (second classified material) of which the size and density are lower than the fiber among the defibrated materials. The first classified material is discharged from the lower outlet 34 and is introduced into the screening unit 40 via a pipe 4. On the other hand, the second classified material is discharged from the upper outlet 35 to a receiving unit 36 via a pipe 5.

The sheet manufacturing apparatus 200 has the classifying unit 30. Thus, the defibrated material passing through the defibrating unit 20 can be separated into the first classified material and the second classified material.

2. Second Embodiment

2.1. Sheet Manufacturing Apparatus

Figure 6:
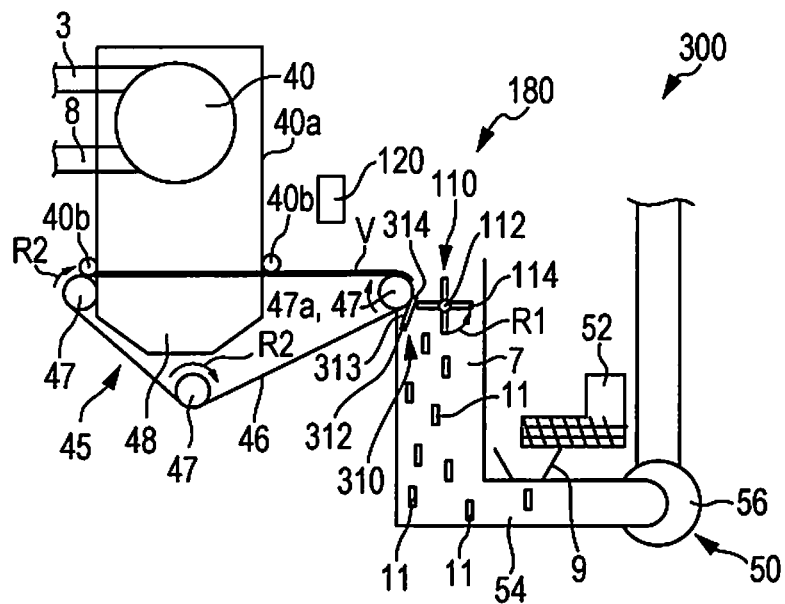
FIG. 6 is a view schematically illustrating a sheet manufacturing apparatus according to a second embodiment.

Next, a sheet manufacturing apparatus according to a second embodiment will be described with reference to the drawings. FIG. 6 is a view schematically illustrating a sheet manufacturing apparatus 300 according to the second embodiment and is an enlarged view of a region including a rotary body 110. Hereinafter, in the sheet manufacturing apparatus 300, points different from the example of the above-described sheet manufacturing apparatus 100 will be described and description of the same points will be omitted.

As illustrated in FIG. 6, the sheet manufacturing apparatus 300 is different from the above-described sheet manufacturing apparatus 100 in that a peeling unit 310 is provided. The peeling unit 310 is a member for peeling a web V deposited on a mesh belt 46 from a mesh belt 46.

Figure 7:
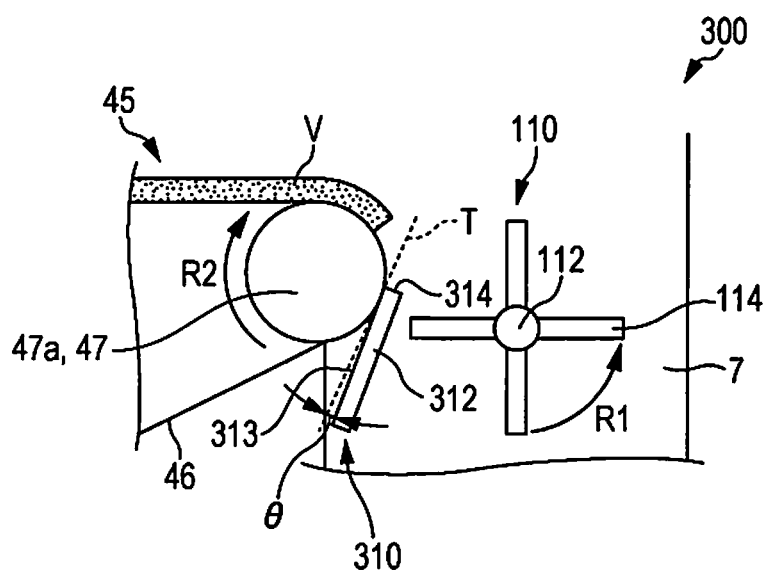
FIG. 7 is a view schematically illustrating the sheet manufacturing apparatus according to the second embodiment.

The peeling unit 310 has a stationary plate 312. Here, FIG. 7 is an enlarged view of a region including the stationary plate 312 of FIG. 6. In the illustrated example, the peeling unit 310 is configured of the stationary plate 312. The stationary plate 312 is provided in the vicinity of (adjacent to) a rotary body 110. In the example illustrated in FIG. 6, a first web forming unit 45 has three tension rollers 47 on which a mesh belt 46 is stretched and the stationary plate 312 faces a tension roller 47a positioned on the nearest side to the rotary body 110 among three tension rollers via the mesh belt 46. The stationary plate 312 comes into contact with the mesh belt 46 in a state where the mesh belt 46 is able to be moved. The stationary plate 312 is fixed without moving with the movement of the mesh belt 46.

The stationary plate 312 has, for example, a planar shape. The stationary plate 312 comes into contact with the mesh belt 46 in a main surface 313. A thickness of the stationary plate 312 is, for example, equal to or greater than 0.05 mm and equal to or less than 1 mm, and is preferably 0.2 mm. The stationary plate 312 is able to come into contact with the web V at an end 314.

In FIG. 7, an angle θ formed by a tangent T of a curve that is formed by the mesh belt 46 and a straight line that is formed by the main surface 313 of the stationary plate 312 in a contact point between the stationary plate 312 and the mesh belt 46 is greater than 0° and equal to or less than 45° and preferably is greater than 0° and equal to or less than 20°.

A base unit 112 of the rotary body 110 is provided below (lower side in a vertical direction) the end 314 of the stationary plate 312. Thus, in the sheet manufacturing apparatus 300, a part of the web V is peeled from the mesh belt 46 by the end 314 of the stationary plate 312 and it is possible to divide the peeled web V by a protrusion unit 114 of the rotary body 110.

The sheet manufacturing apparatus 300 has the peeling unit 310 for peeling the web V from the mesh belt 46. Thus, in the sheet manufacturing apparatus 300, it is possible to reliably peel the web V from the mesh belt 46. Specifically, in the sheet manufacturing apparatus 300, the peeling unit 310 has the stationary plate 312. Thus, it is possible to easily configure the peeling unit 310 only by providing the stationary plate 312.

2.2. Modification Example of Sheet Manufacturing Apparatus

2.2.1. First Modification Example

Figure 8:
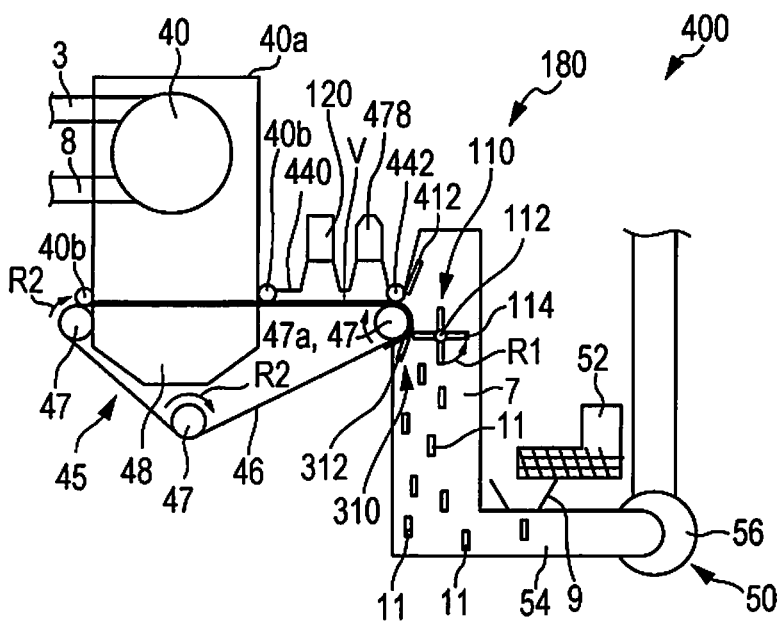
FIG. 8 is a view schematically illustrating a sheet manufacturing apparatus according to a first modification example of the second embodiment.

Next, a sheet manufacturing apparatus according to a first modification example of the second embodiment will be described with reference to the drawings. FIG. 8 is a view schematically illustrating a sheet manufacturing apparatus 400 according to the first modification example of the second embodiment. Hereinafter, in the sheet manufacturing apparatus 400, points different from the examples of the above-described sheet manufacturing apparatuses 100 and 300 will be described and description of the same points will be omitted.

As illustrated in FIG. 8, the sheet manufacturing apparatus 400 is different from the above-described sheet manufacturing apparatus 300 in that a moisture-adjusting unit 478 for adjusting the moisture content of the web V is provided. The moisture-adjusting unit 478 can adjust an amount ratio of the web V and water by adding water or steam to the web V. In the illustrated example, a detection unit 120 is provided in a position in which a thickness of the web V can be detected before adding water and the like to the web V by the moisture-adjusting unit 478, but the detection unit 120 may be provided in a position in which the thickness of the web V can be detected after adding water and the like to the web V by the moisture-adjusting unit 478.

In the sheet manufacturing apparatus 400, a cover unit 440 is provided so as to cover the web V transported to the outside of a housing unit 40a. For example, two openings are provided, the detection unit 120 is provided in one opening, and the moisture-adjusting unit 478 is provided in the other opening in the cover unit 440. The cover unit 440 and a pipe 7 are connected by a pile seal 442. Thus, it is possible to suppress that moisture is leaked from the moisture-adjusting unit 478 to the outside. A configuration of the pile seal 442 is, for example, the same as that of the pile seal 40b.

A peeling unit 310 of the sheet manufacturing apparatus 400 further has a stationary plate 412. The stationary plate 412 is provided above (upper side in the vertical direction) a rotary body 110. In the illustrated example, the stationary plate 412 comes into contact with the pile seal 442. A size and shape of the stationary plate 412 is, for example, the same as those of the stationary plate 312. For example, if the web V is moved along the pile seal 442, the stationary plate 412 can peel the web V from the pile seal 442. The web V that is peeled by the stationary plate 412 is divided by a protrusion unit 114 of the rotary body 110 when passing between the rotary body 110 and a tension roller 47*a*.

The sheet manufacturing apparatus 400 has the moisture-adjusting unit 478. Thus, it is possible to adjust moisture of the web V. Furthermore, the sheet manufacturing apparatus 400 has the stationary plate 412. Thus, for example, if the web V is moved along the pile seal 442, it is possible to peel the web V from the pile seal 442.

Moreover, a configuration, in which a roller disposed so as to face the mesh belt 46 and capable of abutting against the web V, and a seal unit (for example, pile seal) disposed on the pipe 7 side and coming into contact with an outer peripheral surface of the roller are provided, and the web V and a subdivided body 11 are prevented from scattering to the outside of the pipe 7, may be provided instead of the configuration in which the pipe 7 is connected to the cover unit 440. In this case, the stationary plate 412 may be disposed so as to peel the web V adhered to the roller.

2.2.2. Second Modification Example

Figure 9:
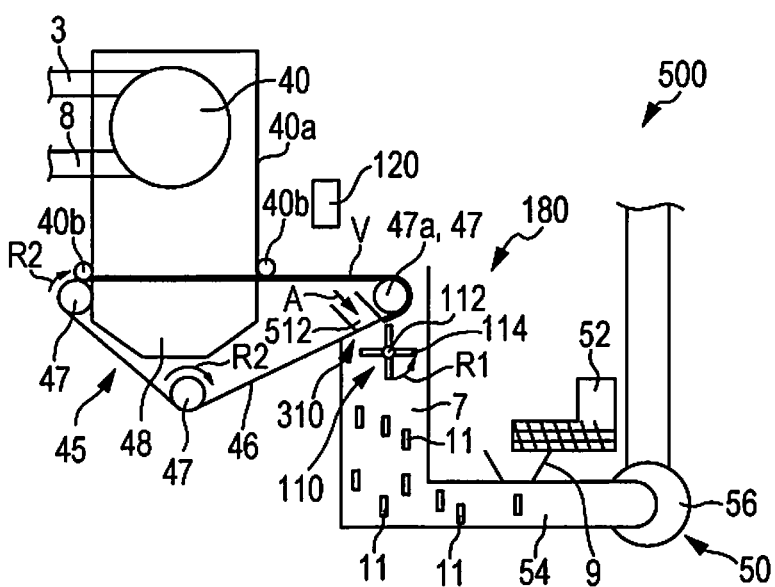
FIG. 9 is a view schematically illustrating a sheet manufacturing apparatus according to a second modification example of the second embodiment.

Next, a sheet manufacturing apparatus according to a second modification example of the second embodiment will be described with reference to the drawing. FIG. 9 is a view schematically illustrating a sheet manufacturing apparatus 500 according to the second modification example of the second embodiment and is an enlarged view of a region including a rotary body 110. Hereinafter, in the sheet manufacturing apparatus 500, points different from the examples of the above-described sheet manufacturing apparatuses 100 and 300 will be described and description of the same points will be omitted.

As illustrated in FIG. 7, in the sheet manufacturing apparatus 300, the peeling unit 310 has the stationary plate 312. On the other hand, as illustrated in FIG. 9, in the sheet manufacturing apparatus 500, a peeling unit 310 has an airflow generation unit 512. In the illustrated example, the peeling unit 310 is configured of the airflow generation unit 512.

The airflow generation unit 512 generates an airflow A in a direction in which a web V is separated from a mesh belt 46. The airflow generation unit 512 generates the airflow A in the vicinity of the rotary body 110. Here, "airflow generation unit 512 generates the airflow A in the vicinity of the rotary body 110" means the airflow A generated by the airflow generation unit 512 reaches the rotary body 110. Specifically, a distance between the airflow generation unit 512 and a base unit 112 of the rotary body 110 is equal to or greater than 0.1 mm and equal to or less than 0.5 mm. In the illustrated example, the airflow generation unit 512 is provided on the inside of the mesh belt 46 and faces the rotary body 110 via the mesh belt 46.

In the sheet manufacturing apparatus 500, a part of the web V is peeled from the mesh belt 46 by the airflow A generated by the airflow generation unit 512 and the peeled web V can be divided by a protrusion unit 114 of the rotary body 110.

Moreover, in the above description, the airflow generation unit 512 is described as an example in which the airflow A is generated by blowing air, but the airflow generation unit 512 may generate the airflow A by suctioning air. In this case, the airflow generation unit 512 is provided on the outside of the mesh belt 46. As the airflow generation unit 512, for example, a fan or a blower can be used.

As described above, the sheet manufacturing apparatus 500 has the airflow generation unit 512. Thus, in the sheet manufacturing apparatus 500, it is possible to reliably peel the web V from the mesh belt 46. Furthermore, in the sheet manufacturing apparatus 500, for example, it is possible to transport a subdivided body 11 to the mixing unit 50 by the airflow A.

3. Third Embodiment

3.1. Sheet Manufacturing Apparatus

Figure 10:
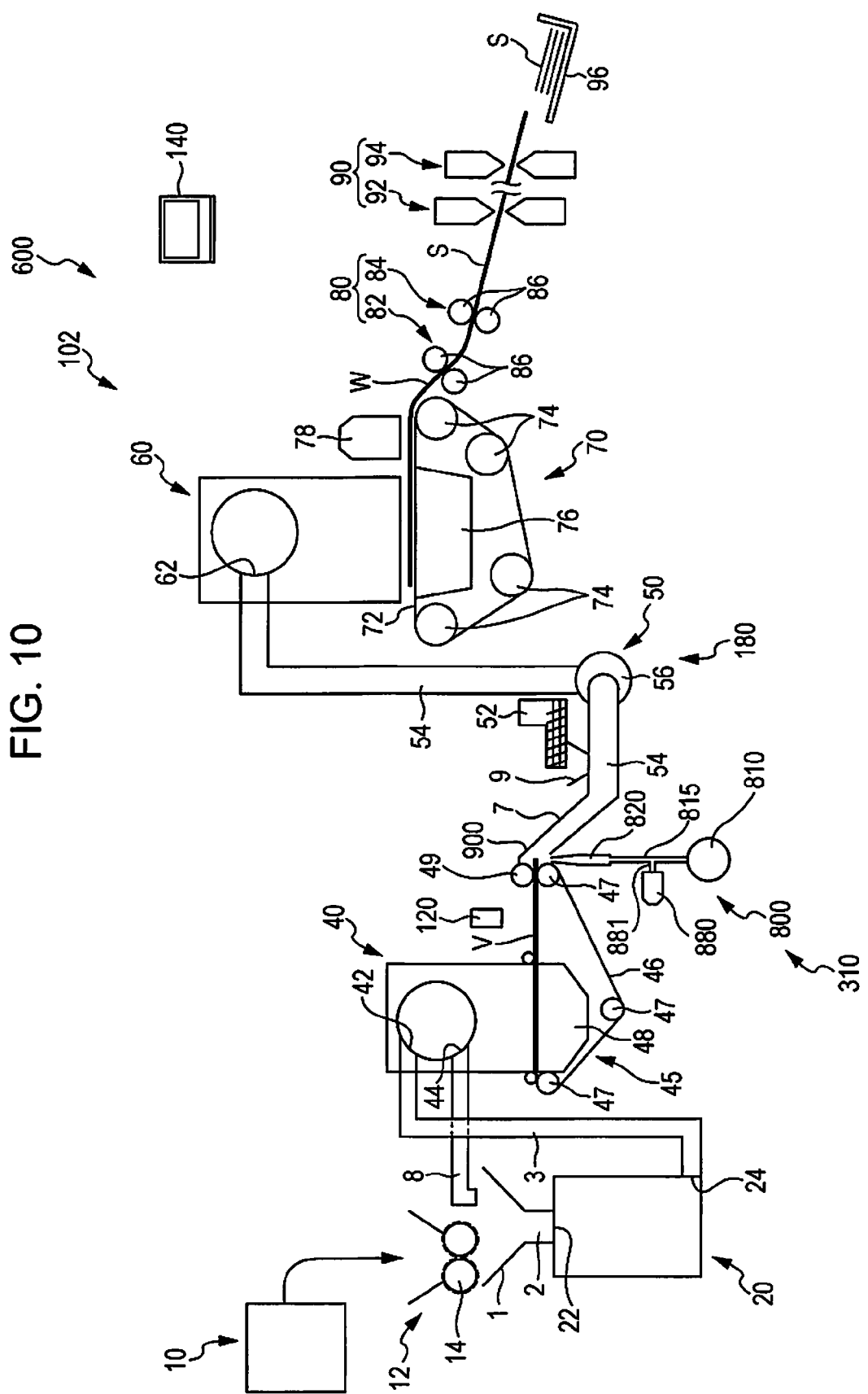
FIG. 10 is a view schematically illustrating the sheet manufacturing apparatus according to a third embodiment.
Figure 11:
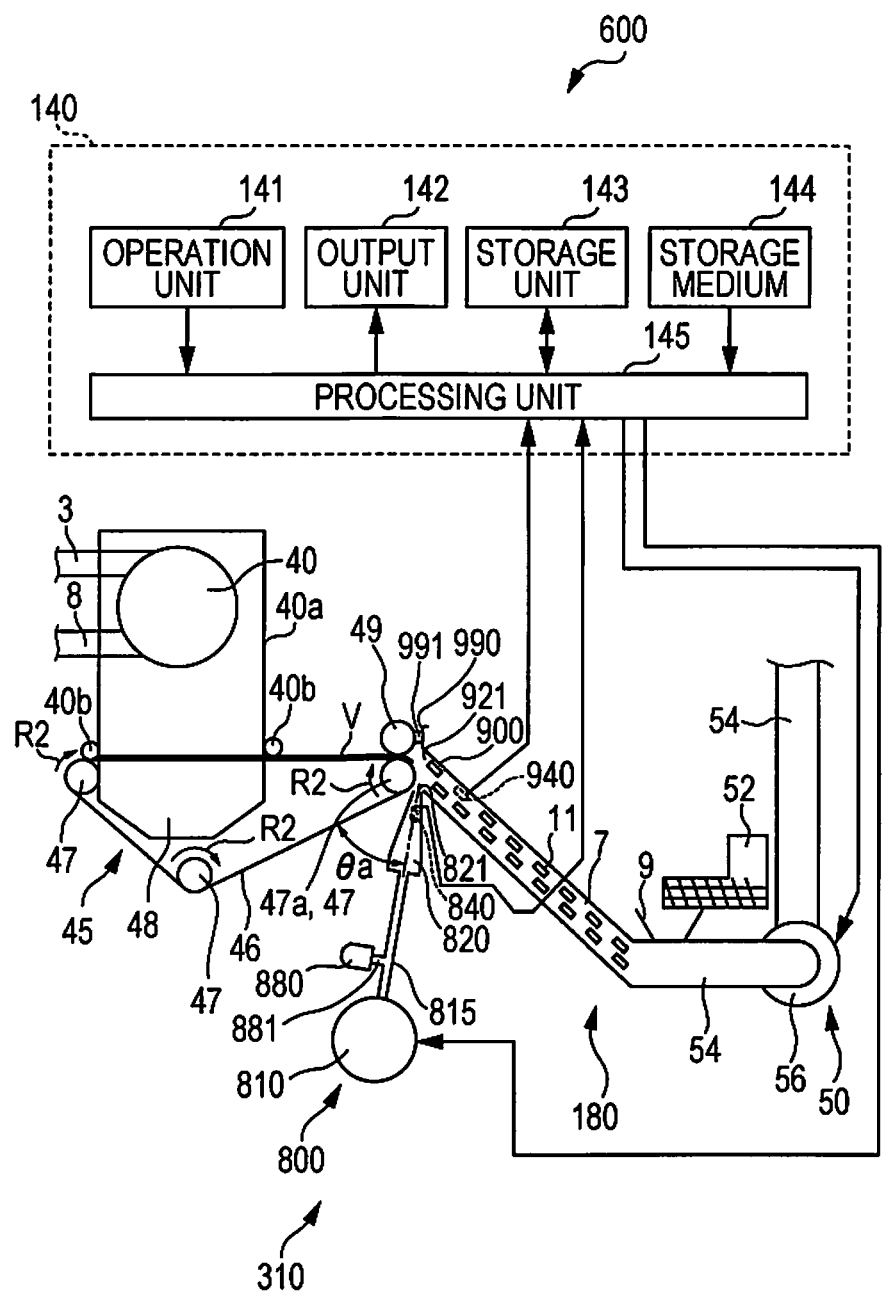
FIG. 11 is a view schematically illustrating the sheet manufacturing apparatus according to the third embodiment.

Next, a sheet manufacturing apparatus according to a third embodiment will be described with reference to the drawings. FIGS. 10 and 11 are views schematically illustrating a sheet manufacturing apparatus 600 according to the third embodiment. Hereinafter, in the sheet manufacturing apparatus 600, points different from the example of the above-described sheet manufacturing apparatus 100 will be described and description of the same points will be omitted.

As illustrated in FIGS. 10 and 11, the sheet manufacturing apparatus 600 is different from the sheet manufacturing apparatus 100 described above in that an airflow generation unit 800 configuring the peeling unit 310 and a suction unit configuring a dividing unit 180 (blower 56 in the present embodiment) are provided.

The airflow generation unit 800 generates an airflow. Accordingly, a portion of the web V is peeled from the deposition surface of the mesh belt 46 by the airflow. Since the web V can be peeled from the deposition surface without coming into contact with the mesh belt 46, it is possible to suppress a load to the mesh belt 46. In addition, by applying the airflow to the mesh belt 46, it is possible to easily peel the defibrated materials which are entangled to the mesh of the mesh belt 46 (compared to the stationary plate 312). The airflow generation unit 800 includes a blower 810, a pipe 815 of which an end is connected to the blower 810, and a blowing unit 820 which is connected to the other end of the pipe 815. The blower 810 generates an airflow for peeling the web V. The blowing unit 820 includes an opening portion 821. The airflow generated by the blower 810 is discharged from the opening portion 821 of the blowing unit 820 through the pipe 815.

Figure 12:
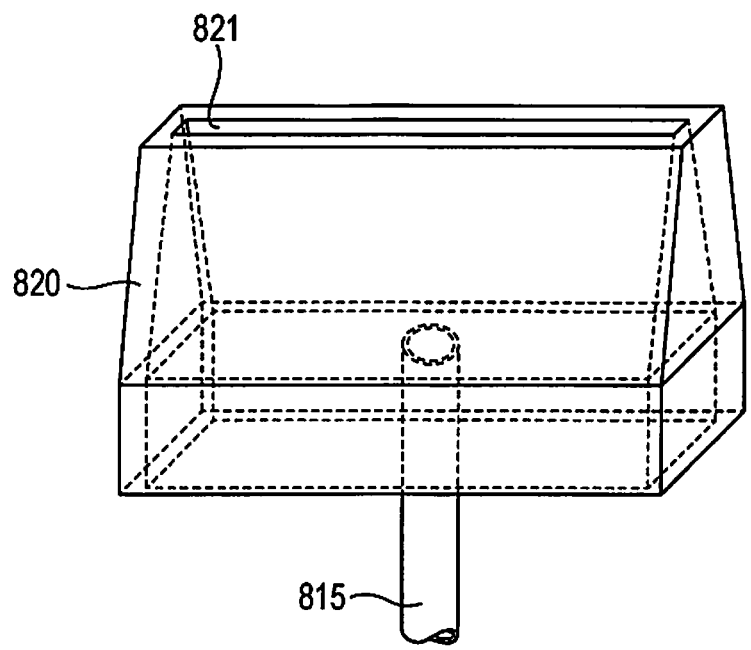
FIG. 12 is a view schematically illustrating a blowing unit of an airflow generation unit according to the third embodiment.

FIG. 12 is a view schematically illustrating a blowing unit of an airflow generation unit according to the present embodiment. As illustrated in FIG. 12, the opening portion 821 of the blowing unit 820 is formed in a rectangular slit shape. In addition, the blowing unit 820 is formed such that the opening area of the cross section in a direction crossing an airflow direction (direction parallel to the opening portion 821) is gradually reduced from the end portion side which is connected to the pipe 815 toward the opening portion 821. Accordingly, it is possible to increase a speed of the airflow which is discharged from the opening portion 821. The length of the opening portion 821 in a longitudinal direction is approximately the same as the width (length in a direction orthogonal to the transporting direction of the web V) of the mesh belt 46.

Figure 13:
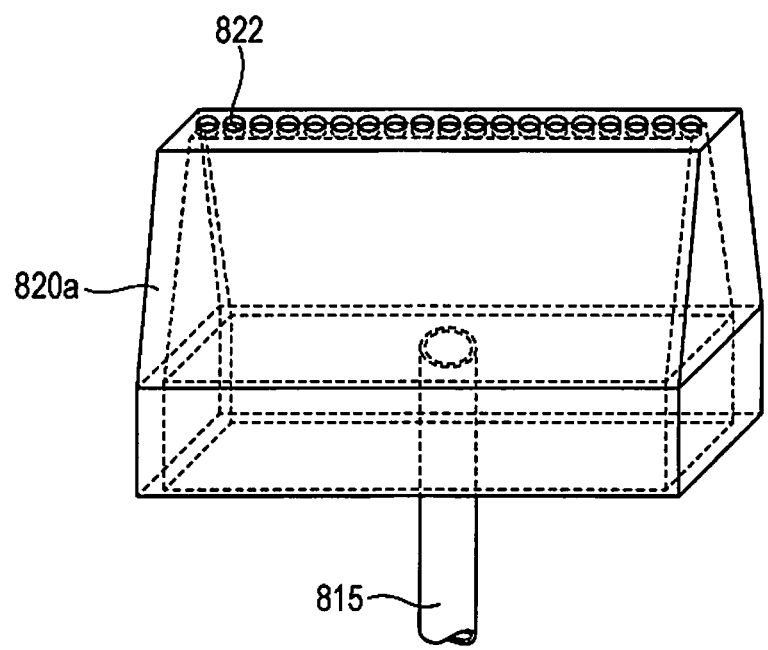
FIG. 13 is a view schematically illustrating an example of other shape of the blowing unit of an airflow generation unit according to the third embodiment.
Figure 14:
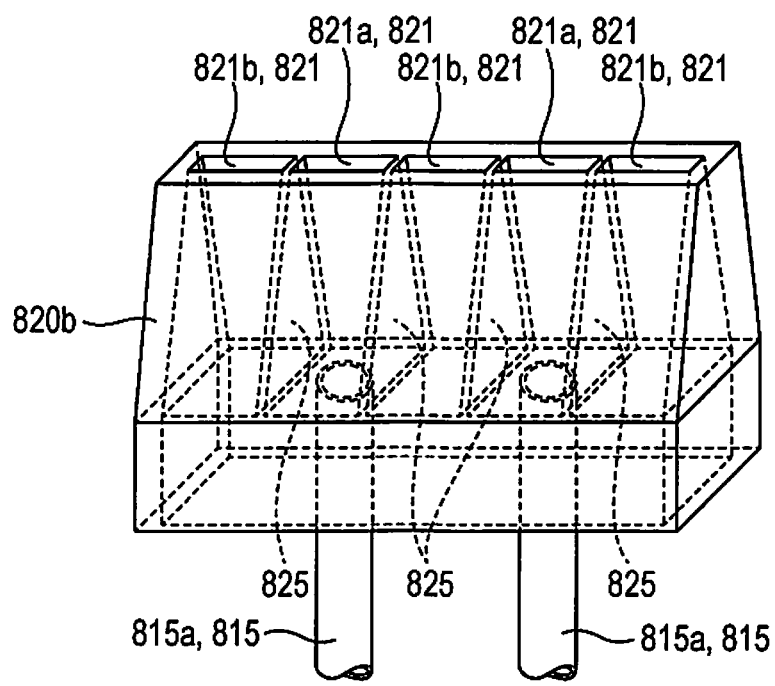
FIG. 14 is a view schematically illustrating an example of other shape of the blowing unit of an airflow generation unit according to the third embodiment.

The shape of the blowing unit 820 is not limited to the above-described configuration. FIGS. 13 and 14 are views schematically illustrating an example of other shapes of the blowing unit of an airflow generation unit. As illustrated in FIG. 13, a blowing unit 820*a* includes a plurality of nozzles 822 which are arranged in a line in a width direction of the mesh belt 46. The airflow generated by the blower 810 is discharged from the nozzles 822 of the blowing unit 820*a* through a pipe 815.

In addition, as illustrated in FIG. 14, in a blowing unit 820*b*, a plurality of partition walls 825 partitioning the internal space and the opening portion 821 of the blowing unit 820*b* in a width direction of the mesh belt 46 is provided. For example, at least a part of the partition walls 825 is formed by a filter, a mesh, or the like. Accordingly, it is configured so as to allow air to pass therethrough. In any of the space portions partitioned by the partition walls 825, a pipe 815a for introducing an airflow generated by the blower 810 is provided. In the example illustrated in FIG. 14, the blowing unit 820b is partitioned into five space portions by the four partition walls 825. Pipes 815a are provided in the two space portions (each of second portions from both the end portions) among them. The opening portion 821 is divided into opening portions 821a corresponding to the space portions in which the pipes 815a are provided and opening portions 821b corresponding to the space portions in which the pipes 815a are not provided. Airflows flown from the pipes 815a are directly discharged from the opening portions 821a, and airflows flown from the pipes 815a and then passed through the partition walls 825 are discharged from the opening portions 821b. Accordingly, the flow rate of the airflows discharged from the opening portions 821b becomes lower (intensity becomes weak) compared to the flow rate of the airflow discharged from the opening portions 821a. Therefore, the intensity difference between the airflows occurs in a width direction of the mesh belt 46 (width direction of the web V). Accordingly, the web V can be easily divided in a direction approximately parallel to the transporting direction of the web V.

In addition, as illustrated in FIG. 11, the airflow generation unit 800 is set so as to apply an airflow to the deposition surface at an acute angle. An angle θa formed of a direction of the airflow discharged from the opening portion 821 and the deposition surface of the mesh belt 46 applied to the tension roller 47a is 0° or greater and less than 90°, and more preferably 0° to 60°. Accordingly, the web V deposited to the mesh belt 46 can be efficiently peeled from the deposition surface.

In addition, in the present embodiment, the moisture content of the airflow applied to the mesh belt 46 by the airflow generation unit 800 is adjusted. The airflow generation unit 800 includes a moisture-adjusting unit 880. The moisture-adjusting unit 880 is connected to the pipe 815 in which the airflow from the blower 810 is sent to the blowing unit 820, through a pipe 881. The moisture-adjusting unit 880 can adjust the humidity of the airflow generated by the blower 810 by releasing the humidity (moisture) into the air. The relative humidity of the airflow is adjusted, for example, at a range of 50% to 70%. The airflow of which the humidity is adjusted is discharged from the opening portion 821 of the blowing unit 820 and then applied to the deposition surface of the mesh belt 46 or the web V. Accordingly, electrostatic charges of the web V and the mesh belt 46 are suppressed. The web V can be easily peeled from the mesh belt 46. The moisture-adjusting unit 880 may be a humidifying unit which increases the humidity.

The blower 56 configuring the suction unit is divided by suction of the web V and forms the subdivided bodies 11. That is, the blower 56 generates an airflow for suction of the peeled web V. The speed of the airflow generated by the blower 56 is set to be faster than the moving speed of the mesh belt 46 (transporting speed of the web V). For example, the speed of the airflow generated by the blower 56 is set to be 10 times or more faster than the moving speed of the mesh belt 46. Accordingly, by the speed difference between the speed of the airflow generated by the blower 56 and the moving speed of the mesh belt 46, the web V is torn along the width direction of the web V (direction intersecting a transporting direction of the web V), and the torn web V becomes the subdivided bodies 11. The subdivided bodies 11 are transported to the blower 56 (deposition unit 60) side by the airflow.

In addition, the dividing unit 180 includes a suction port unit 900 which is connected to the blower 56. The suction port unit 900 has a suction port 921 for suction (inhaling) of the subdivided bodies 11 by the airflow generated by the blower 56. The suction port 921 is provided in a position corresponding to the downstream side end of the web V in a transporting direction. For example, the suction port 921 is arranged so as to face the tension roller 47a and a rotary roller 49 on the downstream side of the tension roller 47a and the rotary roller 49. The suction port unit 900 is connected to the pipe 7, the pipe 7 is connected to the pipe 54, and the pipe 54 is connected to the blower 56. The suction port unit 900 is arranged so as to be downward inclined from the suction port 921 to the pipe 7, and the pipe 7 is arranged so as to be downward inclined to the pipe 54. The subdivided bodies 11 are sucked from the suction port unit 900 by the airflow generated by the blower 56 and are transported to the deposition unit 60 side through the pipe 7 and the pipe 54.

Figure 15:
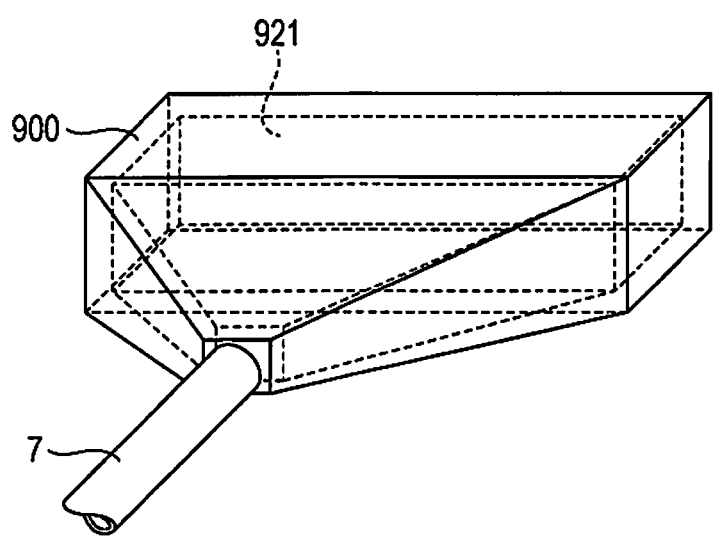
FIG. 15 is a view schematically illustrating a suction port unit of a dividing unit according to the third embodiment.

FIG. 15 is a view schematically illustrating a suction port unit of a dividing unit according to the present embodiment. As illustrated in FIG. 15, the suction port unit 900 includes a suction port 921 which is opened. The suction port 921 is formed in a rectangular slit shape. The suction port unit 900 is formed such that the opening area of the cross section in a direction crossing an airflow direction (direction parallel to the suction port 921) is gradually reduced from the suction port 921 toward the pipe 7. Accordingly, it is possible to increase the speed of the airflow toward the pipe 7. The suction port 921 has a size allowing the subdivided bodies 11 to be sucked, and the length of the longitudinal direction is approximately the same as the width of the mesh belt 46.

Figure 16:
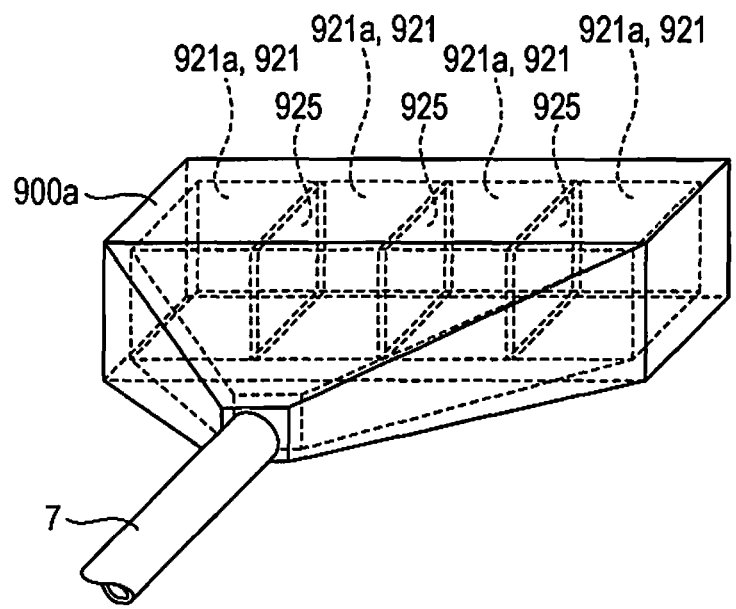
FIG. 16 is a view schematically illustrating an example of other shape of the suction port unit of a dividing unit according to the third embodiment.
Figure 17:
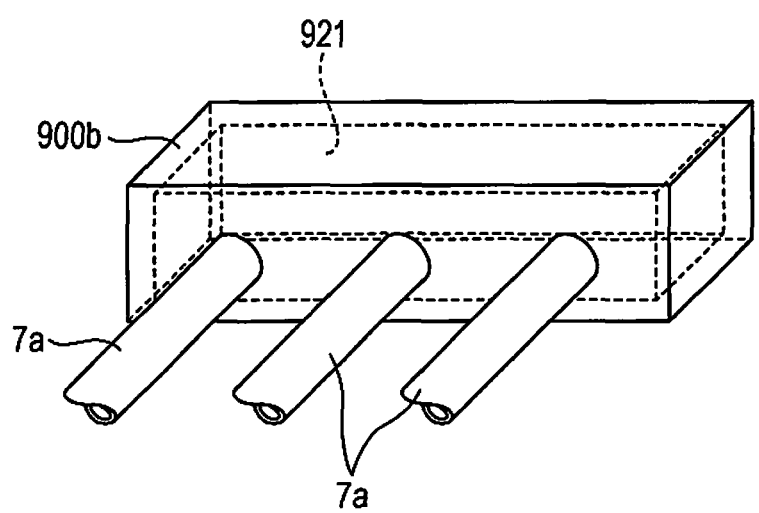
FIG. 17 is a view schematically illustrating an example of other shape of the suction port unit of a dividing unit according to the third embodiment.

The shape of the suction port unit 900 is not limited to the above-described configuration. FIGS. 16 and 17 are views schematically illustrating an example of other shapes of the suction port unit of a dividing unit. As illustrated in FIG. 16, in a suction port unit 900a, a plurality of partition walls 925 partitioning the suction port 921 in a width direction of the mesh belt 46 is provided. The partition walls 925 have, for example, a thin planar shape. In the example illustrated in FIG. 16, four suction ports 921a are formed by three partition walls 925. The web V peeled from the deposition surface of the mesh belt 46 by the airflow generated by the airflow generation unit 800 is sucked and divided by the airflow generated by the blower 56, and the divided web V becomes the subdivided bodies 11. When the subdivided bodies 11 (web V) are sucked in the suction port 921, the web V comes into contact with the front end portion (front edge portion) of the partition walls 925 and is divided in a direction approximately parallel to the transporting direction (suction direction) of the web V. The web V becomes the subdivided bodies 11 having a smaller volume, and is transported to the deposition unit 60 side.

In addition, as illustrated in FIG. 17, a plurality of pipes 7a is connected to the suction port unit 900b. In the example illustrated in FIG. 17, three pipes 7a are provided in an equal interval. The plurality of pipes 7a are joined and connected to one pipe 54. The subdivided bodies 11 (web V) sucked from the suction port 921 are sucked in each pipe 7a, and divided in a direction approximately parallel to the transporting direction (suction direction) of the web V.

In addition, as illustrated in FIG. 11, the first web forming unit 45 has a tension roller 47a which is used as a supporting unit supporting the mesh belt 46 having a deposition surface and a rotary roller 49 facing the tension roller 47a across the mesh belts 46. The rotary roller 49 is arranged so as to come into contact with a sealing unit 991 which is provided in a wall portion 990 disposed on the upper side of the suction port unit 900. Accordingly, the vicinity of the suction port 921 is substantially sealed. The web V deposited in the deposition surface of the mesh belt 46 is nipped by the tension roller 47a and the rotary roller 49 through the mesh belt 46. In addition, the airflow generation unit 800 configuring the peeling unit 310 applies the airflow generated by the blower 810 to the deposition surface of the mesh belt 46 on a further downstream side of the web V further in a transporting direction than the tension roller 47a, and peels the web V from the deposition surface. Since the web V is nipped by the tension roller 47a and the rotary roller 49, the web V in the further downstream side portion of a transporting direction of the web V than the nipped position can be peeled. That is, the position where the web V is peeled from the deposition surface of the mesh belt 46 is stabilized, and the amount (length) of the peeled web V becomes uniform. The blower 56 configuring the dividing unit 180 suctions the peeled web V and divides the sucked web V, and forms the subdivided bodies 11. Accordingly, the variation of the volume of the subdivided bodies 11 transported to the deposition unit 60 can be reduced.

In addition, in the sheet manufacturing apparatus 600 according to the present embodiment, an air volume caused by the blower 56 is set so as to be greater than the air volume caused by the airflow generation unit 800. A first flow velocity sensor 840 for measuring the flow velocity of the airflow by the airflow generation unit 800 and a second flow velocity sensor 940 for measuring the flow velocity of the airflow by the blower 56 are provided. In the present embodiment, the first flow velocity sensor 840 is disposed in a blowing unit 820, and the second flow velocity sensor 940 is disposed in the suction port unit 900. The first flow velocity sensor 840 and the second flow velocity sensor 940 can be applied to, for example, a hot-wire flow velocity sensor. The sensor is not limited to the hot-wire flow velocity sensor and, for example, the sensor is applied to various flow velocity sensors which use a vane-type (Biram's) flow meter, a laser beam, a ultrasonic wave, or a microwave.

The first and second flow velocity sensors 840 and 940 are connected to the control unit 140. In the control unit 140, the air volume caused by the airflow in the blowing unit 820 and the air volume caused by the airflow in the suction port unit 900 are calculated based on measuring data by the first and second flow velocity sensors 840 and 940. The blower 810 and the blower 56 are controlled so that the air volume caused by the blower 56 is set to be greater than the air volume caused by the airflow generation unit 800 compared to the air volume of the both airflows. Specifically, a driving motor of the blower 810 or a driving motor of the blower 56 is controlled. Accordingly, dispersion or the like of the defibrated materials by the airflow discharged from the blowing unit 820 is suppressed, and the subdivided bodies 11 can be sucked in the suction port unit 900. Since the basic configuration of the control unit 140 is the same as the configuration of the first embodiment, the description thereof will be omitted.

According to the above-mentioned embodiments, the following effects can be obtained.

The first screened material passing through the opening of the screening unit 40 is deposited on the mesh belt 46 to form the web V. The web V is transported to the mesh belt 46 in a state where the web V is nipped by the tension roller 47a and the rotary roller 49. The airflow caused by the airflow generation unit 800 is applied to the deposition surface of the mesh belt 46 on a further downstream side of the web V in a transporting direction than the tension roller 47a. Accordingly, the web V, which is positioned on the further downstream side in the transporting direction than the portion nipped by the tension roller 47a and the rotary roller 49, is peeled from the mesh belt 46. The suction force by the blower 56 acts on the peeled web V. Accordingly, the peeled web V is divided to form the subdivided bodies 11, and is transported to the mixing unit 50 (deposition unit 60) side. Thus, in the sheet manufacturing apparatus 600, it is possible to suppress that the plurality of the defibrated materials are supplied to the deposition unit 60 in a state where the plurality of the defibrated materials are entangled together and then become a large lump and to suppress that meshes of the deposition unit 60 are clogged. Thus, in the sheet manufacturing apparatus 600, it is possible to manufacture the sheet S having high uniformity in density and thickness.

4. Fourth Embodiment 4.1 Sheet Manufacturing Apparatus

Figure 18:
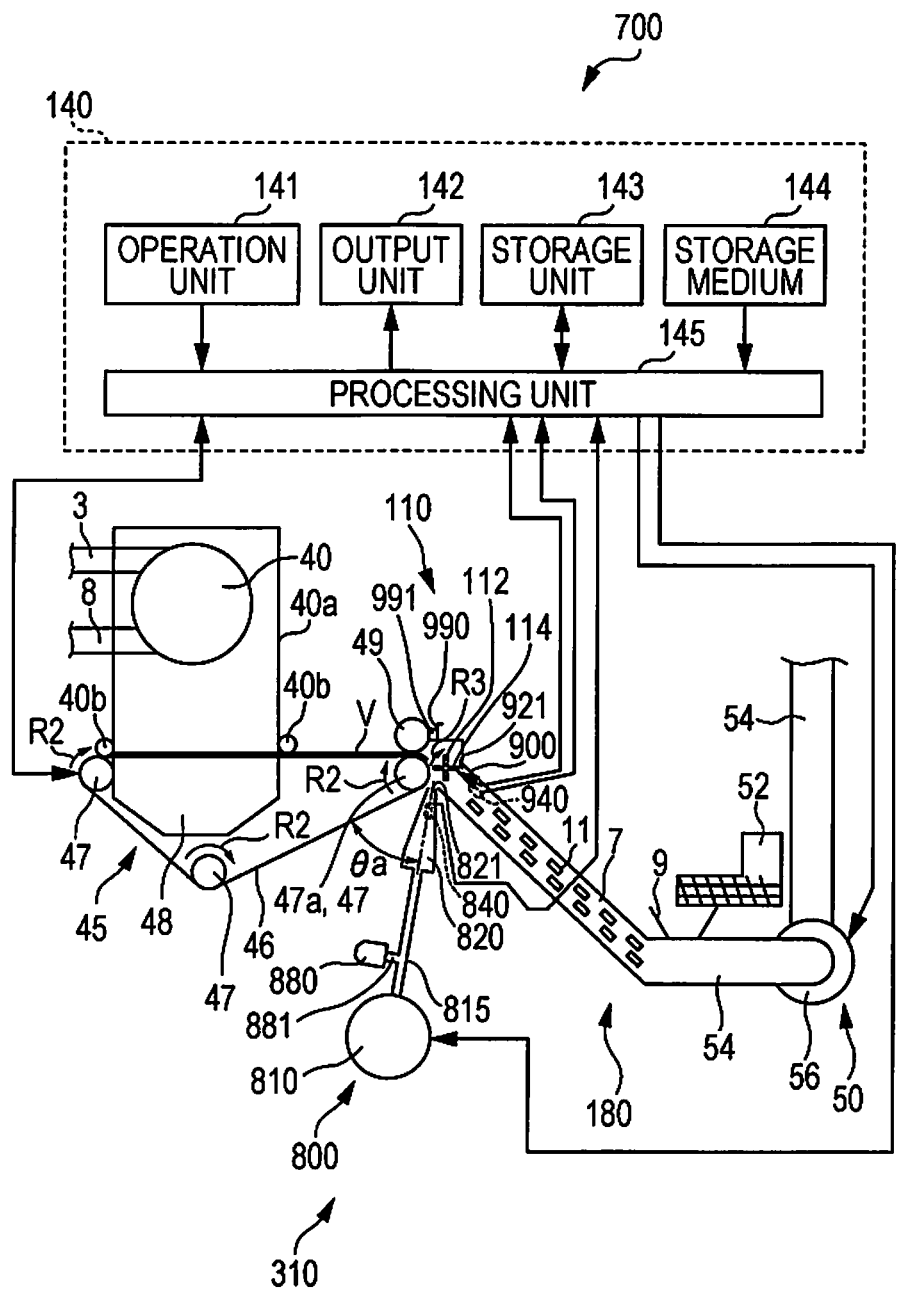
FIG. 18 is a view schematically illustrating the sheet manufacturing apparatus according to a fourth embodiment.

Next, a sheet manufacturing apparatus according to a fourth embodiment will be described with reference to the drawings. FIG. 18 is a view schematically illustrating a sheet manufacturing apparatus 700 according to the fourth embodiment. Hereinafter, in the sheet manufacturing apparatus 700, points different from the example of the above-described sheet manufacturing apparatus 600 will be described and description of the same points will be omitted.

As illustrated in FIG. 18, a sheet manufacturing apparatus 700 includes the airflow generation unit 800 configuring the peeling unit 310, and a suction unit (blower 56 in the present embodiment) configuring the dividing unit 180, and the rotary body 110. In the present embodiment, the dividing unit 180 is different from the sheet manufacturing apparatus 600 described above in that the dividing unit 180 includes the rotary body 110.

The rotary body 110 includes a protrusion unit 114 for forming the subdivided bodies 11 by coming into contact with the web V and then dividing itself. In the present embodiment, the rotary body 110 is an inner part of the suction port unit 900, and is provided in the vicinity of the tension roller 47a. The rotary body 110 is provided in a position where the protrusion unit 114 can come into contact with the web V peeled from the mesh belt 46 by the airflow generation unit 800, and a position which does not comes into contact with the mesh belt 46. The rotary body 110 is disposed in a position apart from the mesh belt 46 so that the airflow discharged from the blowing unit 820 can be passed through between the tip end portion of the protrusion unit 114 and the deposition surface of the mesh belt 46.

Figure 19:
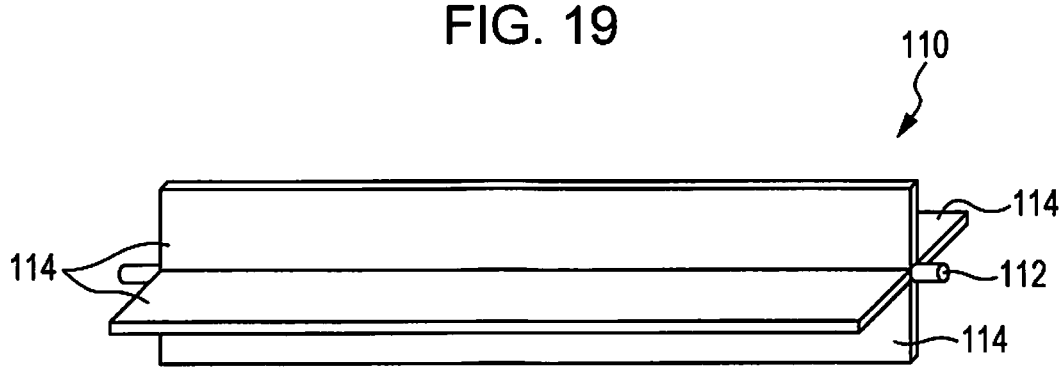
FIG. 19 is a view schematically illustrating a rotary body according to the fourth embodiment.

FIG. 19 is a view schematically illustrating a rotary body according to the present embodiment. As illustrated in FIG. 19, the rotary body 110 has a base unit 112 and a planar shaped protrusion unit 114 protruding from the base unit 112. In the illustrated example, the four protrusion units 114 are provided at equal intervals. The protrusion unit 114 can rotate around the base unit 112. The base unit 112 extends to the web V in a width direction. The length in an extension direction of the base unit 112 of the 114 is the same as the width of the mesh belt 46. The number of the protrusion units 114 is not specifically limited and may be, for example, two.

Figure 20:
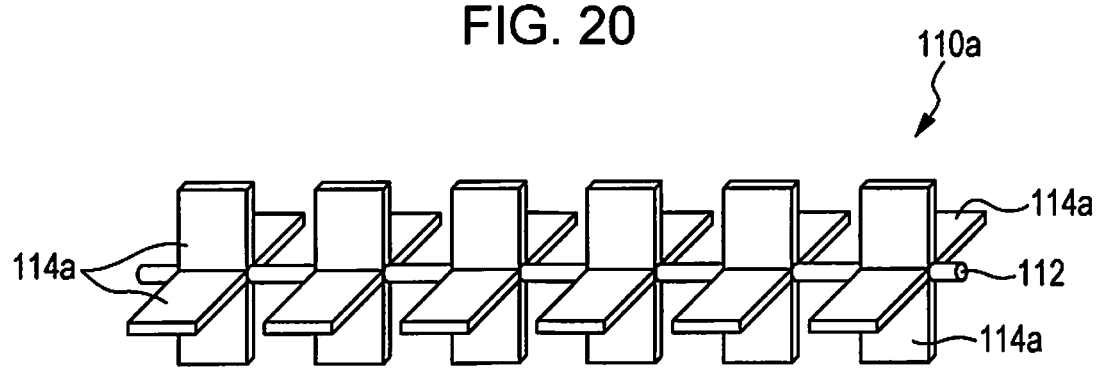
FIG. 20 is a view schematically illustrating an example of other shape of the rotary body according to the fourth embodiment.
Figure 21:
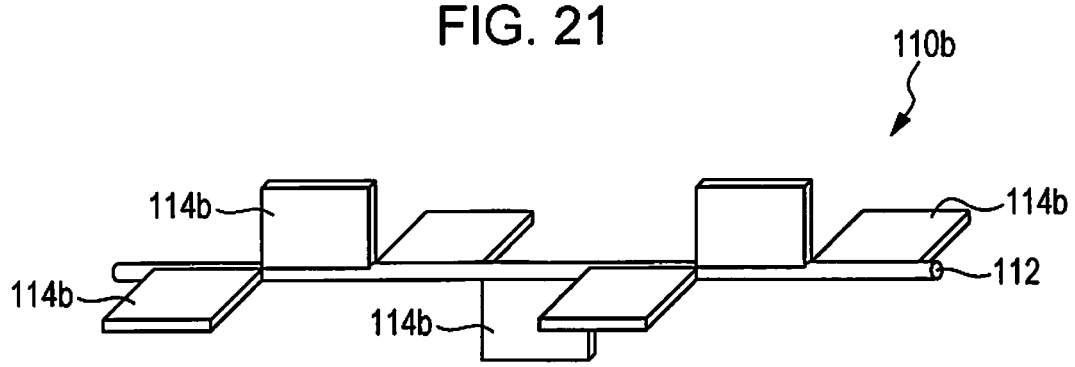
FIG. 21 is a view schematically illustrating an example of other shape of the rotary body according to the fourth embodiment.

The shape of the rotary body 110 is not limited to the above-mentioned configuration. FIGS. 20 and 21 are views schematically illustrating an example of other shapes of the rotary body. As illustrated in FIG. 20, the rotary body 110a has a base unit 112 and a protrusion unit 114a protruding from the base unit 112. Here, a plurality of protrusion units 114a is arranged in an extension direction of the base unit 112. A constant interval is provided between the adjacent protrusion units 114a. In a case of using the rotary body 110a, since in the web V, a portion which comes into contact with the protrusion units 114a and a portion which does not come into contact with the protrusion units 114a occur in the width direction of the rotary body 110a, the web V can be divided in a direction approximately parallel to the transporting direction.

In addition, as illustrated in FIG. 21, a rotary body 110b has the base unit 112 and the protrusion unit 114b protruding from the base unit 112. Here, the plurality of protrusion units 114b are disposed in an extension direction of the base unit 112, and the adjacent protrusion units 114a are disposed in positions which are shifted by an angle of about 90° in a rotating direction. In a case of using the rotary body 110b, since in the web V, a portion which comes into contact with the protrusion units 114b and a portion which does not come into contact with the protrusion units 114b occurs in the width direction of the rotary body 110b, the web V can be divided in a direction approximately parallel to the transporting direction.

The shape of the protrusion units 114, 114a, and 114b is not limited to the planar shape. For example, the shape thereof may be a pin shape. Even in this case, the same effect can be obtained. In the sheet manufacturing apparatus 700 of the present embodiment, since the web V peeled by the airflow is divided, the rotary body 110 can be disposed in a position separated from the mesh belt 46 compared to the sheet manufacturing apparatus 100 of the first embodiment. Accordingly, the shape of the tip end portion of the protrusion unit 114 (114a and 114b) of a rotary body 111 is made in a sharp blade-shaped, and the web V can be easily divided.

The rotating direction of the rotary body 110 can be appropriately set such as a discharging direction of the airflow caused by the airflow generation unit 800. In the present embodiment, the airflow caused by the airflow generation unit 800 is discharged from bottom to top. Accordingly, the rotary body 110 is rotated in an arrow direction R3 (clockwise direction in FIG. 18) along the discharging direction of the airflow caused by the airflow generation unit 800. Therefore, since the rotating direction of the rotary body 110 does not go against the discharging direction of the airflow caused by the airflow generation unit 800, the driving load is reduced, and the web V can be easily divided.

In addition, in the sheet manufacturing apparatus 700 of the present embodiment, the peripheral speed of the rotary body 110 is set to be faster than the moving speed of the mesh belt 46 (transporting speed of the web V). For example, each of the tension roller 47 and the rotary body 110 is provided with a speed detection sensor for detecting the rotating speed such as a rotary encoder (not illustrated). In the control unit 140, by comparing the peripheral speed of the rotary body 110 with the moving speed of the mesh belt 46 based on the detection data obtained by the speed detection sensor, the peripheral speed of the rotary body 110 is set so as to be faster than the moving speed of the mesh belt 46, for example, the driving motor for rotating the rotary body 110 is controlled. For example, in a case where the moving speed of the mesh belt 46 is set to be in a range of 20 mm to 100 mm per second, the peripheral speed of the rotary body 110 is controlled so as to be a speed which is two times or more the moving speed of the mesh belt. Accordingly, the web V can be more finely divided. Since the basic configuration of the control unit 140 is the same as the configuration of the first embodiment, the description thereof will be omitted.

According to the above-mentioned embodiments, the following effects can be obtained.

Even in a state where an amount of the air of the blower 56 is suppressed, the subdivided bodies 11 can be formed by dividing the web V by the rotary body 110. Accordingly, the energy consumption caused by the blower 56 can be reduced.

In the airflow generation units 800 according to the third and fourth embodiments, the airflow is discharged toward the mesh belt 46, and peels the web V from the mesh belt 46, but the configuration is not limited thereto. For example, in the airflow generation unit 800, a configuration in which the web V is peeled from the mesh belt 46 by suction of the air may be used. Even in this case, the same effect can be obtained.

Moreover, the sheet S manufactured by the sheet manufacturing apparatus of the invention mainly refers to those in a sheet shape. However, the sheet S is not limited to the sheet shape and may be a board shape or a web shape. In the present specification, the sheet is divided into paper and non-woven fabric. Paper includes aspects formed in a thin sheet shape using pulp and the waste paper as the raw material, and includes recording paper for writing or printing, wallpaper, wrapping paper, colored paper, drawing paper, Kent paper, and the like. Since non-woven fabric has a thickness thicker than that of paper or has strength lower than that of paper, the non-woven fabric includes general non-woven fabric, fiber board, tissue paper (tissue paper for cleaning), kitchen paper, cleaner, filter, liquid (waste ink and oil) absorption material, sound-absorbing material, thermal insulation material, cushioning material, mat, and the like. Furthermore, as the raw material, plant fibers such as cellulose, chemical fibers such as polyethylene terephthalate (PET) and polyester, and animal fibers such as wool and silk may be included.

The invention omits a part of a configuration within a range having features and effects or may combine each embodiment and modification example. Moreover, the manufacturing unit 102 omits a part of a configuration within a range in which the sheet can be manufactured, adds another configuration, or may be replaced with a known configuration.

The invention includes substantially the same configuration (for example, the same configuration in the function, the method, and the result or the same configuration in the object and the effect) as the configuration described in the embodiment. In addition, the invention includes configurations that replace non-essential portions of the configuration described in the embodiments. In addition, the invention includes configurations that can achieve the same operational effect or the same object as the configuration described in the embodiments. In addition, the invention includes configurations that are obtained by adding known techniques to the configuration described in the embodiments.

The entire disclosure of Japanese Patent Application No. 2015-054415, filed Mar. 18, 2015 and 2016-028632, filed Feb. 18, 2016 are expressly incorporated by reference herein.

What is claimed is:

1. A sheet manufacturing apparatus comprising:
   an impeller mill which suctions and defibrates a raw material containing fiber, and discharges a defibrated material;
   a first sieve which has a first net and screens the defibrated material by causing the defibrated material to pass through the first net;
   a first belt, the defibrated material which passes through the first sieve being deposited at an upper side of the first belt to form a first web;
   a rotary body having a protrusion radially protruded from a rotation center, the rotary body dividing the first web by rotation to form a subdivided body that is configured by the defibrated material;
   a second sieve which has a second net and refines the subdivided body by causing the subdivided body to pass through the second net to screen the subdivided body;
   a second belt, a refined subdivided body which passes through the second sieve being deposited at an upper side of the second belt to form a second web; and
   a heating roller which heats the second web from the second belt to form a sheet.

2. The sheet manufacturing apparatus according to claim 1, further comprising
   a plate which comes into contact with the first belt so that the first web is peeled from the first belt.

3. The sheet manufacturing apparatus according to claim 2, further comprising
   a plurality of tension rollers on which the first belt is stretched,
   wherein the plate faces one of the tension rollers, which is positioned close to the rotary body, and comes into contact with the first belt.

4. The sheet manufacturing apparatus according to claim 1, further comprising
   a first blower that generates an airflow, wherein
   the first web is peeled from the first belt by the airflow generated by the first blower.

5. The sheet manufacturing apparatus according to claim 4, further comprising
   a pipe connected to the first blower, wherein
   the airflow, which is generated by the first blower, is discharged from the pipe at an acute angle to the first web.

6. The sheet manufacturing apparatus according to claim 4, further comprising
   a pipe that is connected to the first blower and discharges the airflow toward the first web, and
   a moisture adjusting unit that is connected to the pipe and adjusts humidity of the airflow.

7. The sheet manufacturing apparatus according to claim 1, further comprising
   a subdivided body-transfer blower arranged between the rotary body and the second sieve, wherein
   the subdivided body-transfer blower transfers the subdivided body from the rotary body to the second sieve.

* * * * *